United States Patent
Suzuki et al.

(10) Patent No.: US 12,218,339 B2
(45) Date of Patent: Feb. 4, 2025

(54) METHOD FOR MANUFACTURING DOPED ELECTRODE AND METHOD FOR MANUFACTURING POWER STORAGE DEVICE

(71) Applicant: MUSASHI ENERGY SOLUTIONS CO., LTD., Hokuto (JP)

(72) Inventors: Hirobumi Suzuki, Minato-ku (JP); Kenji Kojima, Minato-ku (JP); Masaya Naoi, Minato-ku (JP); Nobuo Ando, Minato-ku (JP); Hiroki Yakushiji, Minato-ku (JP); Kazunari Aita, Minato-ku (JP); Masahiro Yamamoto, Hokuto (JP)

(73) Assignee: MUSASHI ENERGY SOLUTIONS CO., LTD., Hokuto (JP)

( * ) Notice: Subject to any disclaimer, the term of this patent is extended or adjusted under 35 U.S.C. 154(b) by 554 days.

(21) Appl. No.: 17/638,557

(22) PCT Filed: Jun. 25, 2020

(86) PCT No.: PCT/JP2020/025044
§ 371 (c)(1),
(2) Date: Feb. 25, 2022

(87) PCT Pub. No.: WO2021/039085
PCT Pub. Date: Mar. 4, 2021

(65) Prior Publication Data
US 2022/0302434 A1    Sep. 22, 2022

(30) Foreign Application Priority Data
Aug. 30, 2019 (JP) .................. 2019-158839

(51) Int. Cl.
*H01M 4/139* (2010.01)
*H01M 4/02* (2006.01)
(Continued)

(52) U.S. Cl.
CPC ......... *H01M 4/139* (2013.01); *H01M 4/0404* (2013.01); *H01M 4/0459* (2013.01); *H01M 10/058* (2013.01); *H01M 2004/027* (2013.01)

(58) Field of Classification Search
CPC ............... H01M 4/139; H01M 4/0404; H01M 2004/027
See application file for complete search history.

(56) References Cited

U.S. PATENT DOCUMENTS 9,825,302 B1    11/2017 Shin et al.
2012/0048739 A1    3/2012 Choi et al.
(Continued)

FOREIGN PATENT DOCUMENTS

EP    0 752 727 B1    12/1999
JP    10-308212 A    11/1998
(Continued)

OTHER PUBLICATIONS

Machine Translation of KR-20140106645-A (Aug. 29, 2024) (Year: 2024).*

(Continued)

*Primary Examiner* — Matthew J Merkling
(74) *Attorney, Agent, or Firm* — Oblon, McClelland, Maier & Neustadt, L.L.P.

(57) ABSTRACT

A doped electrode is manufactured by an electrode manufacturing method. The doped electrode includes an active material doped with an alkali metal. In the electrode manufacturing method, a dope solution is brought into contact with an electrode. The electrode includes a current collector and an active material layer. The active material layer is formed on a surface of the current collector and includes the active material. The dope solution includes an alkali metal ion and flows. In the electrode manufacturing method, for example, the alkali metal is electrically doped to the active (Continued)

material using a counter electrode member arranged to face the electrode.

12 Claims, 17 Drawing Sheets

(51) Int. Cl.
*H01M 4/04* (2006.01)
*H01M 10/058* (2010.01)

(56) References Cited

U.S. PATENT DOCUMENTS

| 2013/0284988 | A1* | 10/2013 | Satake | H01G 11/06 |
| | | | | 252/518.1 |
| 2016/0190545 | A1 | 6/2016 | Momo et al. | |
| 2019/0074143 | A1 | 3/2019 | Naoi et al. | |
| 2019/0356014 | A1* | 11/2019 | Abe | H01M 4/505 |
| 2020/0028152 | A1 | 1/2020 | Hirose et al. | |
| 2021/0384486 | A1* | 12/2021 | Iwazaki | B05C 13/02 |
| 2022/0020538 | A1* | 1/2022 | Otani | H01M 4/0459 |
| 2022/0158156 | A1* | 5/2022 | Naoi | H01M 4/049 |
| 2022/0173375 | A1* | 6/2022 | Aono | H01M 4/133 |

FOREIGN PATENT DOCUMENTS

| JP | 2005-123175 A | 5/2005 | | |
| JP | 2006-107795 A | 4/2006 | | |
| JP | 2008-77963 A | 4/2008 | | |
| JP | 2008-91191 A | 4/2008 | | |
| JP | 2009-246137 A | 10/2009 | | |
| JP | 2012-49543 A | 3/2012 | | |
| JP | 2012-49544 A | 3/2012 | | |
| JP | 2013-258392 A | 12/2013 | | |
| JP | 2018-170251 A | 11/2018 | | |
| JP | 2018-206560 A | 12/2018 | | |
| KR | 20140106645 A | * | 9/2014 | |
| WO | WO-2013183524 A1 | * | 12/2013 | H01M 4/0442 |

OTHER PUBLICATIONS

Machine Translation of WO-2013183524-A1 (Aug. 29, 2024) (Year: 2024).*
Combined Chinese Office Action and Search Report issued on Jun. 14, 2023 in Chinese Patent Application No. 202080061214.3 (with English translation of Office Action), 17 pages.
Extended European Search Report issued on Aug. 10, 2023 in European Patent Application No. 20857809.6, 10 pages.
Chinese Office Action issued Jan. 27, 2024 in Chinese Patent Application No. 202080061214.3 (with English translation), 13 pages.
Japanese Office Action issued Jan. 23. 2024 in Japanese Patent Application No. 2021-542057 (with English machine-generated translation), 8 pages.

* cited by examiner

METHOD FOR MANUFACTURING DOPED ELECTRODE AND METHOD FOR MANUFACTURING POWER STORAGE DEVICE

CROSS-REFERENCE TO RELATED APPLICATIONS

The present application is the national stage of international application PCT/JP2020/025044, filed on Jun. 25, 2020, and claims the benefit of the filing date of Japanese Appl. No. 2019-158839, filed on Aug. 30, 2019, with the Japan Patent Office, and the entire disclosure of JP 2019-158839 is incorporated by reference herein.

TECHNICAL FIELD

The present disclosure relates to a method for manufacturing a doped electrode, a method for manufacturing a power storage device, an electrode manufacturing system and a doped electrode.

BACKGROUND ART

Electronic devices have been remarkably downsized and light-weighted in recent years. As a result, there are further increasing demands for also downsizing and light-weighting batteries used as power sources to drive the electronic devices.

In order to satisfy such demands for downsizing and light-weighting, non-aqueous electrolyte rechargeable batteries represented by lithium ion rechargeable batteries have been developed. Furthermore, lithium ion capacitors have been known as power storage devices adapted for applications that require high energy density characteristics and high output characteristics. Furthermore, also known are sodium ion type batteries and sodium ion type capacitors using sodium that is lower in cost and more abundant in resources than lithium.

In such batteries and capacitors, a process to dope an electrode with an alkali metal beforehand is adopted for various purposes (generally this process is referred to as pre-doping). Examples of a method for pre-doping the electrode with the alkali metal may include a continuous method. In the continuous method, pre-doping is performed while transporting a belt-like shaped electrode in a dope solution. The continuous method is disclosed in patent documents 1-4.

PRIOR ART DOCUMENTS

Patent Documents

Patent Document 1: Japanese Unexamined Patent Application Publication No. H10-308212
Patent Document 2: Japanese Unexamined Patent Application Publication No. 2008-77963
Patent Document 3: Japanese Unexamined Patent Application Publication No. 2012-49543
Patent Document 4: Japanese Unexamined Patent Application Publication No. 2012-49544

SUMMARY OF THE INVENTION

Problems to be Solved by the Invention

It is necessary to improve a dope speed in the pre-doping. In one aspect of the present disclosure, it is preferable to provide a method for manufacturing a doped electrode, a method for manufacturing a power storage device, an electrode manufacturing system which can improve the dope speed in the pre-doping, and a power storage device.

Means for Solving the Problems

One aspect of the present disclosure is an electrode manufacturing method for manufacturing a doped electrode containing an active material doped with an alkali metal, the method including: doping an alkali metal to an active material by bringing a dope solution in contact with an electrode, the dope solution flowing and containing an alkali metal ion, the electrode including a current collector and an electrode active material layer, the electrode active material layer formed on a surface of the current collector and containing the active material.

The method for manufacturing the doped electrode in one aspect of the present disclosure can improve a dope speed in the pre-doping.

Another aspect of the present disclosure is a method for manufacturing a power storage device including an electrode cell, the method including: doping an alkali metal to an active material by bringing a dope solution in contact with a negative electrode, the dope solution flowing and containing an alkali metal ion, the negative electrode including a negative current collector and a negative electrode active material layer, the negative electrode active material layer formed on a surface of the negative current collector and containing the active material; and after the alkali metal is doped to the active material, stacking the negative electrode and an electrode different from the negative electrode to form the electrode cell.

The method for manufacturing the power storage device in another aspect of the present disclosure can improve the dope speed in the pre-doping of a negative electrode.

Another aspect of the present disclosure is an electrode manufacturing system for manufacturing a doped electrode containing an active material doped with an alkali metal by performing, on an electrode, a process of doping an alkali metal to an active material, the electrode including a current collector and an active material layer, the active material layer formed on a surface of the current collector and containing the active material.

The electrode manufacturing system includes: a dope bath storing a dope solution containing an alkali metal ion to carry out the process; and a flow section that causes the dope solution stored in the dope bath to flow.

The electrode manufacturing system in another aspect of the present disclosure can improve the dope speed in the pre-doping.

EXPLANATION OF REFERENCE NUMERALS

1 . . . electrode, 3 . . . current collector, 5 . . . active material layer, 6 . . . active material layer formed portion, 7 . . . active material layer unformed portion, 11 . . . electrode manufacturing system, 15 . . . electrolyte solution treatment bath, 17, 19, 21 . . . dope bath, 23 . . . cleaning bath, 25, 27, 29, 31, 33, 35, 37, 39, 40, 41, 43, 45, 46, 47, 49, 51, 52, 53, 55, 57, 58, 59, 61, 63, 64, 65, 67, 69, 70, 71, 73, 75, 77, 79, 81, 83, 85, 87, 89, 91, 93 . . . conveyor roller, 101 . . . supply roll, 103 . . . wind-up roll, 105 . . . supporting table, 107 . . . circulation filtration section, 109, 110, 111, 112, 113, 114 . . . power source, 117 . . . tab cleaner, 119 . . . collection section, 121 . . . end sensor, 131 . . . upstream bath, 133 . . . downstream bath, 137, 139, 141, 143 . . . counter electrode member, 149, 151 . . . space, 153 . . . conductive base material, 155 . . . alkali metal-containing plate, 157 . . . porous insulating member, 161 . . . filter, 163 . . . pump, 165 . . . pipe, 201 . . . flow section, 203, 205, 207, 209, 211, 213, 215, 217 . . . nozzle, 219, 221 . . . pump, 223, 225, 227, 229 . . . pipe, 231 . . . hole, 301 electrode test piece, 303 main body, 305 protruding portion, 307 lead, 309 Teflon plate, 311 . . . opening, 312 electrode assembly, 313 . . . stainless steel plate, 315 recess, 317 threaded bore, 319 tube connector, 321 fluororubber tube, 323 . . . lithium metal plate, 325 . . . Teflon plate, 327 . . . opening, 329 . . . main body, 331 . . . notch, 333 . . . counter electrode member, 335 . . . spacer, 337 . . . opening, 339 . . . simplified doped electrode manufacturing apparatus, 401 . . . frame, 403 . . . bus bar, 405 . . . electroconductive spacer, 407 . . . copper plate, 409 . . . lithium plate, 411 . . . mask, 413, 415, 417 . . . nozzle, 419, 421, 423 . . . pipe, 431 . . . hole

MODE FOR CARRYING OUT THE INVENTION

Example embodiments of the present disclosure will be described with reference to the drawings.

First Embodiment

1. Configuration of Electrode 1

Figure 1:
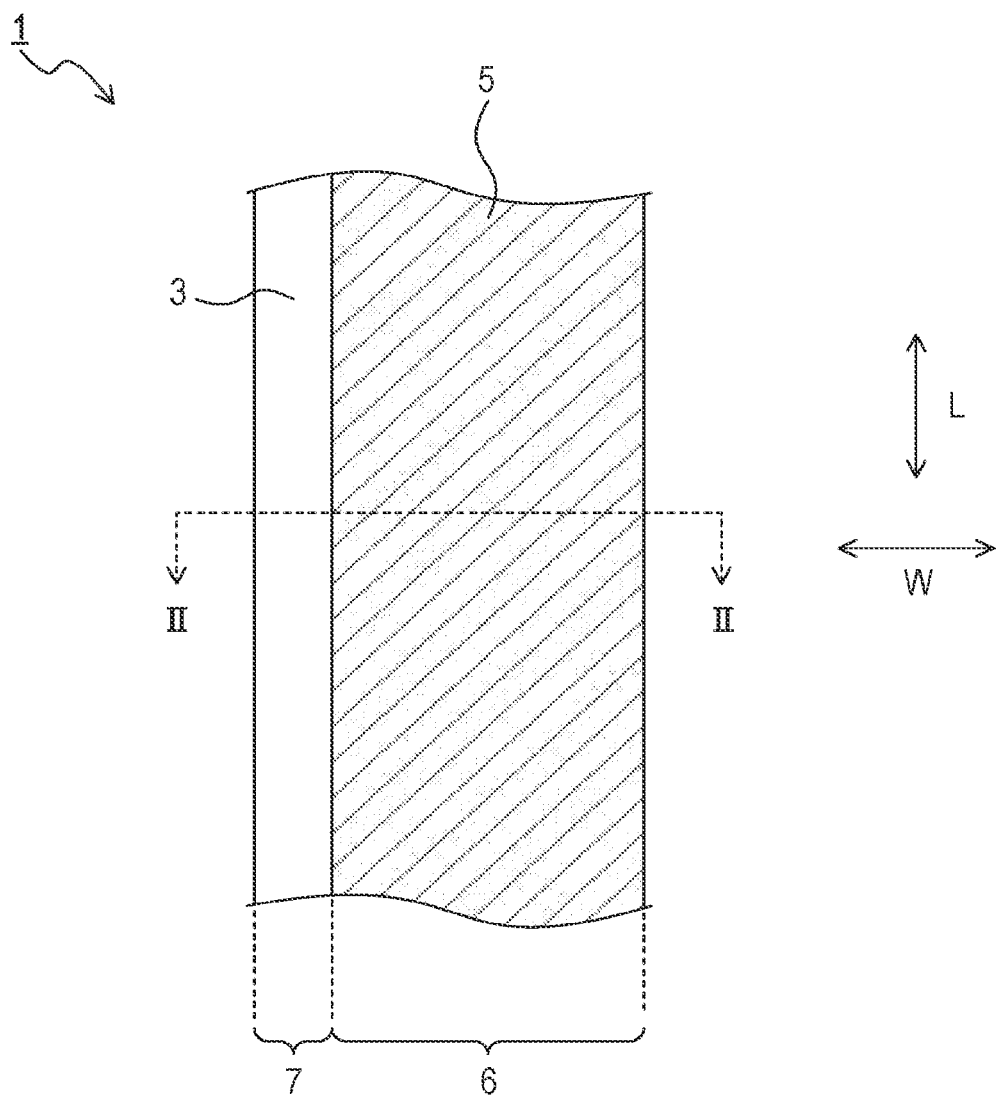
FIG. 1 is a plane view showing a configuration of an electrode.
Figure 2:
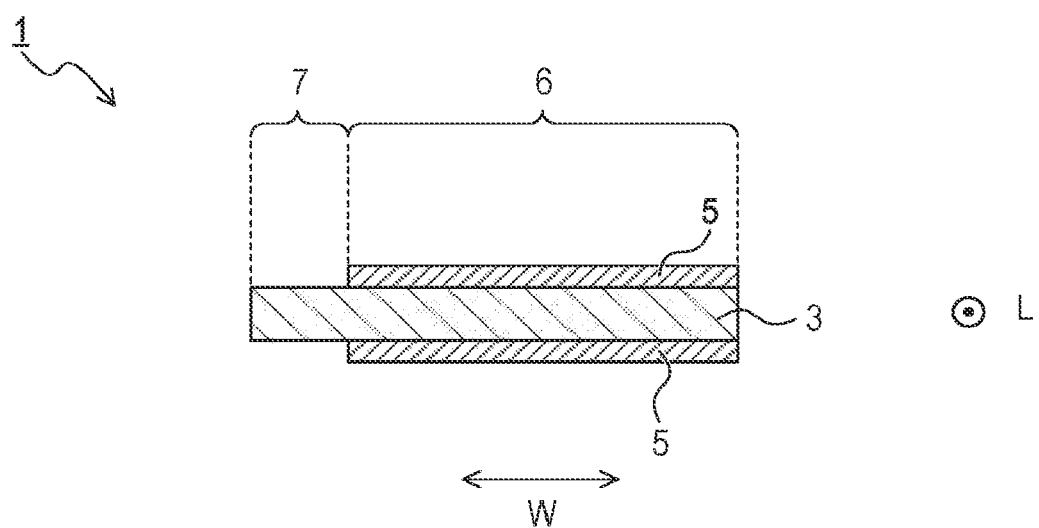
FIG. 2 is a cross-sectional view showing II-II cross section in FIG. 1.

Based on FIG. 1 and FIG. 2, a configuration of an electrode 1 will be described. The electrode 1 has a belt-like shape. The electrode 1 comprises a current collector 3 and an active material layer 5. The current collector 3 has a belt-like shape. The active material layer 5 is formed on both sides of the current collector 3.

The electrode 1 has an active material layer formed portion 6 and an active material layer unformed portion 7 on the surface thereof. The active material layer formed portion 6 is a portion where the active material layer 5 is formed. The active material layer unformed portion 7 is a portion where the active material layer 5 is not formed. In the active material layer unformed portion 7, the current collector 3 is exposed.

The active material layer unformed portion 7 has a belt-like shape extending in a longitudinal direction L of the electrode 1. The active material layer unformed portion 7 is located at the end of the electrode 1 in a width direction W of the electrode 1.

For example, the current collector 3 is preferably a metallic foil such as copper, nickel, and stainless steel. The current collector 3 may include a conductive layer composed primarily of carbon materials and formed on the metal foil. The current collector 3 has a thickness of, for example, 5 to 50 μm.

The active material layer 5 can be produced, for example, by spreading a slurry containing active materials and a binder onto the current collector 3 and drying.

Examples of the binder may include a rubber binder, such as styrene-butadiene rubber (SBR) and NBR; a fluorinated resin, such as polytetrafluoroethylene and polyvinylidene fluoride; polypropylene, polyethylene, and a fluorine modified (meta) acrylic-based binder as disclosed in JP 2009-246137A.

The slurry may include other components in addition to the active materials and the binder. Examples of other components may include a conductive agent and a thickener. Examples of the conductive agent may include carbon black, graphite, vapor-grown carbon fiber, and metal powder. Examples of the thickener may include carboxyl methyl cellulose, Na salt thereof or ammonium salt, methyl cellulose, hydroxymethyl cellulose, ethyl cellulose, hydroxypropyl cellulose, polyvinyl alcohol, oxidized starch, phosphorylated starch, and casein.

A thickness of the active material layer 5 is not particularly limited. The thickness of the active material layer 5 is, for example, 5 μm or more and 500 μm or less, preferably 10 μm or more and 200 μm or less, particularly preferably 10 μm or more and 100 μm or less.

An electrode active material contained in the active material layer 5 is not particularly limited if the active material is applicable to a battery or a capacitor that uses insertion and desorption of an alkali metal ion. The active material may be a negative electrode active material and a positive electrode active material.

The negative electrode active material is not particularly limited. Examples of the negative electrode active material may include a carbon material, such as graphite, easily-graphitized carbon, hardly-graphitized carbon or a composite carbon material in which a graphite particle is coated with carbide of pitch or resin; and a material containing a metal or a semimetal, such as Si and Sn that can be alloyed with lithium or a material containing oxides thereof.

Specific examples of the carbon material may include a carbon material disclosed in JP 2013-258392A. Specific examples of the metal or the semimetal that can be alloyed with lithium, or a material containing oxide thereof may include materials disclosed in JP 2005-123175A and JP 2006-107795A.

Examples of the positive electrode active material may include transition metal oxide, such as cobalt oxide, nickel oxide, manganese oxide, vanadium oxide; a sulfur-based active material, such as simple sulfur substance and metal sulfide. Both of the positive electrode active material and the negative electrode active material may be formed of a single substance or a mixture of two or more substances.

The active material contained in the active material layer 5 is pre-doped with an alkali metal using an electrode manufacturing system 11 described below. The alkali metal that is pre-doped to the active material may be preferably lithium or sodium, and particularly preferably lithium. When using the electrode 1 for production of an electrode of a lithium ion rechargeable battery, the active material layer 5 has a density of preferably 1.30 g/cc or more and 2.00 g/cc or less, and particularly preferably 1.40 g/cc or more and 1.90 g/cc or less. When using the electrode 1 for production of an electrode of a lithium ion capacitor, the active material layer 5 has a density of preferably 0.50 g/cc or more and 1.50 g/cc or less, and particularly preferably 0.60 g/cc or more and 1.20 g/cc or less.

2. Configuration of Electrode Manufacturing System 11

Figure 3:
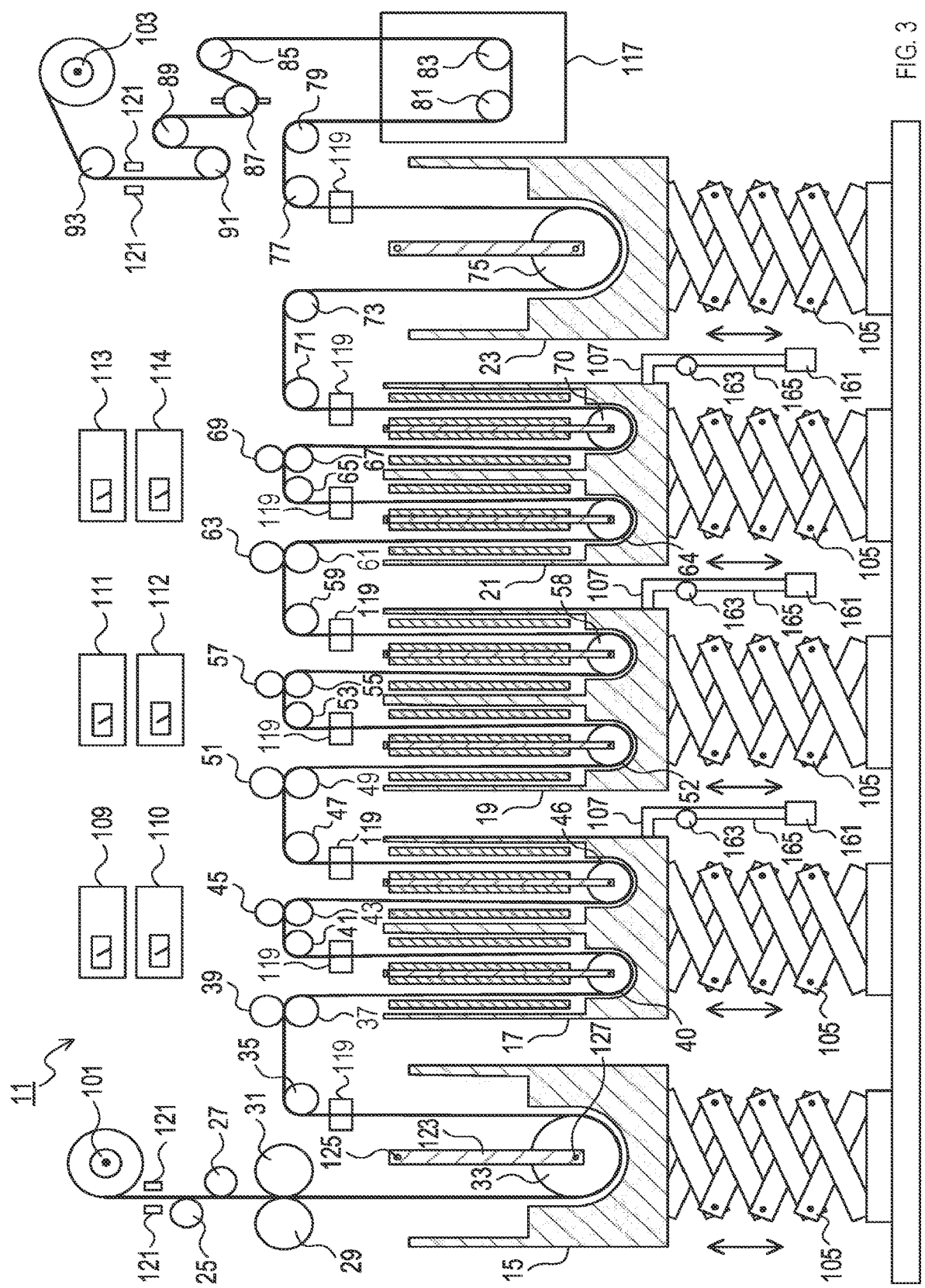
FIG. 3 is an explanatory diagram showing a configuration of an electrode manufacturing system.

Configuration of the electrode manufacturing system 11 will be described based on FIG. 3 to FIG. 7. As shown in FIG. 3, the electrode manufacturing system 11 includes an electrolyte solution treatment bath 15, dope baths 17, 19, 21, a cleaning bath 23, conveyor rollers 25, 27, 29, 31, 33, 35, 37, 39, 40, 41, 43, 45, 46, 47, 49, 51, 52, 53, 55, 57, 58, 59, 61, 63, 64, 65, 67, 69, 70, 71, 73, 75, 77, 79, 81, 83, 85, 87, 89, 91, 93 (hereinafter they may be collectively referred to as conveyer roller group, a supply roll 101, a wind-up roll 103, supporting tables 105, circulation filtration sections 107, six power sources 109, 110, 111, 112, 113, 114, a tab cleaner 117, a collection section 119, and end sensors 121. In FIG. 3, the illustration of a flow section 201 described below is omitted for convenience.

The electrolyte solution treatment bath 15 is a square tank with an opening at the top. The electrolyte solution treatment bath 15 has a bottom surface having a substantially U-shaped cross-sectional shape. The electrolyte solution treatment bath 15 includes a partition plate 123. The partition plate 123 is supported by a supporting rod 125 penetrating the upper end thereof. The supporting rod 125 is fixed to a wall or the like that is not shown. The partition plate 123 extends vertically and divides the inside of the electrolyte solution treatment bath 15 into two spaces.

In the electrolyte solution treatment bath 15, the electrode 1 is immersed in the electrolyte solution before the electrode 1 reaches the dope baths 17, 19, and 21. Therefore, the electrode 1 becomes more easily doped. As a result, it becomes even easier to obtain a desired doped electrode.

The conveyor roller 33 is attached to the bottom end of the partition plate 123. The partition plate 123 and the conveyor roller 33 are supported by a supporting rod 127 penetrating the partition plate 123 and the conveyor roller 33. The partition plate 123 is partially cut at the vicinity of the bottom end thereof so as not to come in contact with the conveyor roller 33. Space exists between the conveyor roller 33 and the bottom surface of the electrolyte solution treatment bath 15.

A configuration of the dope bath 17 will be described based on FIG. 4. The dope bath 17 is formed from an upstream bath 131 and a downstream bath 133. The upstream bath 131 is placed on a supply roll 101 side (hereinafter, referred to as an upstream side), the downstream bath 133 is placed on a wind-up roll 103 side (hereinafter, referred to as a downstream side).

First, a configuration of the upstream bath 131 will be described. The upstream bath 131 is a square tank with an opening at the top. The upstream bath 131 has a bottom surface having a substantially U-shaped cross-sectional shape. The upstream bath 131 includes a partition plate 135 and four counter electrode members 137, 139, 141, 143.

The partition plate 135 is supported by a supporting rod 145 penetrating the upper end thereof. The supporting rod 145 is fixed to a wall or the like that is not shown. The partition plate 135 extends vertically and divides the inside of the upstream bath 131 into two spaces. The conveyor roller 40 is attached to the bottom end of the partition plate 135. The partition plate 135 and the conveyor roller 40 are supported by a supporting rod 147 penetrating the partition plate 135 and the conveyor roller 40. The partition plate 135 is partially cut at the vicinity of the bottom end thereof so as not to come in contact with the conveyor roller 40. Space exists between the conveyor roller 40 and the bottom surface of the upstream bath 131.

The counter electrode member 137 is arranged on the upstream side in the upstream bath 131. The counter electrode members 139, 141 are arranged so as to sandwich the partition plate 135 from both sides. The counter electrode member 143 is arranged on the downstream side in the upstream bath 131.

A space 149 exists between the counter electrode member 137 and the counter electrode member 139. A space 151 exists between the counter electrode member 141 and the counter electrode member 143. The counter electrode members 137, 139, 141, 143 are connected to one electrode of a power source 109. The counter electrode members 137, 139, 141, 143 have similar configurations. Herein, based on FIG. 5, the configuration of the counter electrode members 137, 139 will be described.

The counter electrode members 137, 139 have a configuration in which a conductive base material 153, an alkali metal-containing plate 155, and a porous insulating member 157 are stacked. Examples of a material of the conductive base material 153 may include copper, stainless steel, and nickel. The form of the alkali metal-containing plate 155 is not particularly limited, and examples thereof may include an alkali metal plate and an alloy plate of an alkali metal. Examples of the alkali metal included in the alkali metal-containing plate 155 may include lithium and sodium. The alkali metal-containing plate 155 has a thickness of, for example, 0.03 mm to 6 mm.

The porous insulating member 157 has a plate shape. The porous insulating member 157 is stacked on the alkali metal-containing plate 155. The plate shape of the porous insulating member 157 is a shape when the porous insulating member 157 is stacked on the alkali metal-containing plate 155. The porous insulating member 157 may be a member keeping a constant shape in itself or, for example, may be a member easily deformable, such as nets.

The porous insulating member 157 is porous. Therefore, a dope solution described below can pass through the porous insulating member 157. This enables the alkali metal-containing plate 155 to be in contact with the dope solution.

Examples of the porous insulating member 157 may include a resin mesh. Examples of the resin may include polyethylene, polypropylene, nylon, polyetheretherketone, and polytetrafluoroethylene. The opening of the mesh can be appropriately set. The opening of the mesh is, for example, 0.1 μm to 10 mm, and preferably 0.1 mm to 5 mm. The thickness of the mesh can be appropriately set.

The thickness of the mesh is, for example, 1 μm to 10 mm, and preferably 30 μm to 1 mm. The opening ratio of the mesh can be appropriately set. The opening ratio of the mesh is, for example, 5% to 98%, and preferably 5% to 95%, and further preferably 50% to 95%.

The porous insulating member 157 may be entirely formed of an insulating material, or may partially include an insulating layer.

The downstream bath 133 has a configuration that is basically similar to the configuration of the upstream bath 131. However, the downstream bath 133 has a conveyor roller 46 inside thereof instead of the conveyor roller 40. The counter electrode members 137, 139, 141, and 143 included in the downstream bath 133 are connected to one electrode of a power source 110.

The dope bath 19 has a configuration that is basically similar to the configuration of the dope bath 17. However, the dope bath 19 has conveyor rollers 52, 58 inside thereof instead of the conveyor rollers 40, 46. The counter electrode members 137, 139, 141, 143 that the upstream bath 131 of the dope bath 19 includes are connected to one electrode of a power source 111. The counter electrode members 137, 139, 141, 143 included in the downstream bath 133 of the dope bath 19 are connected to one electrode of a power source 112.

The dope bath 21 has a configuration that is basically similar to the configuration of the dope bath 17. However, the dope bath 21 has conveyor rollers 64, 70 inside thereof instead of the conveyor rollers 40, 46. The counter electrode members 137, 139, 141, 143 included in the upstream bath 131 of the dope bath 21 are connected to one electrode of a power source 113. The counter electrode members 137, 139, 141, 143 included in the downstream bath 133 of the dope bath 21 are connected to one electrode of a power source 114.

The cleaning bath 23 has a configuration that is basically similar to the configuration of the electrolyte solution treatment bath 15. However, the cleaning bath 23 has a conveyor roller 75 inside thereof instead of the conveyor roller 33. The electrode 1 passed through the dope bath 21 is covered with the electrolyte solution taken from the dope bath 21. In the cleaning bath 23, the electrolyte solution attached to the electrode 1 is removed effectively. Therefore, the electrode 1 can be easily handled in the next process.

Among the conveyor roller group, the conveyor rollers 37, 39, 43, 45, 49, 51, 55, 57, 61, 63, 67, and 69 are formed of electrically conductive materials. Among the conveyer roller group, other conveyor rollers are formed of elastomer except for their bearing portions. The conveyer roller group conveys the electrode 1 along a specific path. The path that the conveyer roller group conveys the electrode 1 extends from the supply roll 101, passes through the electrolyte solution treatment bath 15, the dope bath 17, the dope bath 19, the dope bath 21, the cleaning bath 23, and the tab cleaner 117 sequentially in this order and reaches the wind-up roll 103.

A portion of the path passing through the electrolyte solution treatment bath 15 first runs downward by the conveyor rollers 29, 31, and is directed upward by the conveyor roller 33.

A portion of the path passing through the dope bath 17 is as follows. First, the path is directed downward by the conveyor roller 37, and runs downward in the space 149 of the upstream bath 131. Then, the path is directed upward by the conveyor roller 40 and runs upward in the space 151 of the upstream bath 131. Next, the path is directed downward by the conveyor rollers 41, 43 and runs downward in the space 149 of the downstream bath 133. Sequentially, the path is directed upward by the conveyor roller 46 and runs upward in the space 151 of the downstream bath 133. Finally, the path is directed horizontally by the conveyor roller 47 and runs toward the dope bath 19.

A portion of the path passing through the dope bath 19 is as follows. The path is directed downward by the conveyor roller 49 and runs downward in the space 149 of the upstream bath 131. Then, the path is directed upward by the conveyor roller 52 and runs upward in the space 151 of the upstream bath 131. Next, the path is directed downward by the conveyor rollers 53, 55 and runs downward in the space 149 of the downstream bath 133. Sequentially, the path is directed upward by the conveyor roller 58 and runs upward in the space 151 of the downstream bath 133. Finally, the path is directed horizontally by the conveyor roller 59 and runs toward the dope bath 21.

A portion of the path passing through the dope bath 21 is as follows. First, the path is directed downward by the conveyor roller 61 and runs downward in the space 149 of the upstream bath 131. Then, the path is directed upward by the conveyor roller 64 and runs upward in the space 151 of the upstream bath 131. Next, the path is directed downward by the conveyor rollers 65, 67 and runs downward in the space 149 of the downstream bath 133. Sequentially, the path is directed upward by the conveyor roller 70 and runs upward in the space 151 of the downstream bath 133. Finally, the path is directed horizontally by the conveyor roller 71 and runs toward the cleaning bath 23.

A portion of the path passing through the cleaning bath 23 is a path that is first directed downward by the conveyor roller 73 to run downward, and then directed upward by the conveyor roller 75.

The supply roll 101 winds up and keeps the electrode 1. That is, the supply roll 101 holds the electrode 1 in a wound up state. The active material in the electrode 1 held around the supply roll 101 is not yet doped with the alkali metal.

The conveyer roller group draws the electrode 1 held by the supply roll 101 and conveys it. The wind-up roll 103 winds up the electrode 1 conveyed by the conveyer roller group and stores it. The electrode 1 stored around the wind-up roll 103 has been pre-doped in the dope baths 17, 19, 21. Thus, the active material in the electrode 1 stored around the wind-up roll 103 is doped with the alkali metal. The electrode 1 stored around the wind-up roll 103 corresponds to a doped electrode.

The supporting tables 105 support the electrolyte solution treatment bath 15, the dope baths 17, 19, 21 and the cleaning bath 23 from below. The supporting tables 105 are height adjustable. The circulation filtration section 107 is provided to each of the dope baths 17, 19, 21. The circulation filtration section 107 includes a filter 161, a pump 163, and a pipe 165.

In the circulation filtration section 107 provided to the dope bath 17, the pipe 165 is a circulation pipe that extends from the dope bath 17, passes through the pump 163 and the filter 161 sequentially in this order, and returns to the dope bath 17. The dope solution in the dope bath 17 circulates through the pipe 165 and the filter 161 and returns to the dope bath 17 again by driving force of the pump 163. At this time, the foreign matters and the like in the dope solution are filtered by the filter 161. Examples of the foreign matters may include a foreign matter precipitated from the dope solution or a foreign matter occurred from the electrode 1. Examples of a material of the filter 161 may include a resin, such as polypropylene and polytetrafluoroethylene. The pore size of the filter 161 may be appropriately set. The pore size of the filter 161 is, for example, 0.2 μm or more and 50 μm or less.

The circulation filtration section 107 provided to each of the dope baths 19, 21 also has a similar configuration and exerts similar functions and effects. In FIG. 3 and FIG. 4, the illustration of the dope solution is omitted for convenience.

The power source 109 has one terminal connected to the conveyor rollers 37, 39. The power source 109 has the other terminal connected to the counter electrode members 137, 139, 141, 143 provided in the upstream bath 131 of the dope bath 17. The electrode 1 is in contact with the conveyor rollers 37, 39. The electrode 1 and the counter electrode members 137, 139, 141, 143 are in the dope solution that is the electrolyte solution. Thus, in the upstream bath 131 of the dope bath 17, the electrode 1 and the counter electrode members 137, 139, 141, 143 are electrically connected through the electrolyte solution.

The power source 110 has one terminal connected to the conveyor rollers 43, 45. The power source 110 has the other terminal connected to the counter electrode members 137, 139, 141, 143 provided to the downstream bath 133 of the dope bath 17. The electrode 1 is in contact with the conveyor rollers 43, 45. The electrode 1 and the counter electrode members 137, 139, 141, 143 are in the dope solution that is the electrolyte solution. Thus, in the downstream bath 133 of the dope bath 17, the electrode 1 and the counter electrode members 137, 139, 141, 143 are electrically connected through the electrolyte solution.

The power source 111 has one terminal connected to the conveyor rollers 49, 51. The power source 111 has the other terminal connected to the counter electrode members 137, 139, 141, 143 provided to the upstream bath 131 of the dope bath 19. The electrode 1 is in contact with the conveyor rollers 49, 51. The electrode 1 and the counter electrode members 137, 139, 141, 143 are in the dope solution that is the electrolyte solution. Thus, in the upstream bath 131 of the dope bath 19, the electrode 1 and the counter electrode members 137, 139, 141, 143 are electrically connected through the electrolyte solution.

The power source 112 has one terminal connected to the conveyor rollers 55, 57. The power source 112 has the other terminal connected to the counter electrode members 137, 139, 141, 143 provided to the downstream bath 133 of the dope bath 19. The electrode 1 is in contact with the conveyor rollers 55, 57. The electrode 1 and the counter electrode members 137, 139, 141, 143 are in the dope solution that is the electrolyte solution. Thus, in the downstream bath 133 of the dope bath 19, the electrode 1 and the counter electrode members 137, 139, 141, 143 are electrically connected through the electrolyte solution.

The power source 113 has one terminal connected to the conveyor rollers 61, 63. The power source 113 has the other terminal connected to the counter electrode members 137, 139, 141, 143 provided to the upstream bath 131 of the dope bath 21. The electrode 1 is in contact with the conveyor rollers 61, 63. The electrode 1 and the counter electrode members 137, 139, 141, 143 are in the dope solution that is the electrolyte solution. Thus, in the upstream bath 131 of the dope bath 21, the electrode 1 and the counter electrode members 137, 139, 141, 143 are electrically connected through the electrolyte solution.

The power source 114 has one terminal connected to the conveyor rollers 67, 69. The power source 114 has the other terminal connected to the counter electrode members 137, 139, 141, 143 provided to the downstream bath 133 of the dope bath 21. The electrode 1 is in contact with the conveyor rollers 67, 69. The electrode 1 and the counter electrode members 137, 139, 141, 143 are in the dope solution that is the electrolyte solution. Thus, in the downstream bath 133 of the dope bath 21, the electrode 1 and the counter electrode members 137, 139, 141, 143 are electrically connected through the electrolyte solution.

Performing a doping process in a state where the electrode 1 and the counter electrode members 137, 139, 141, 143 are electrically connected through the electrolyte solution corresponds to electrically doping the alkali metal to the active material using the counter electrode members 137, 139, 141, 143 facing the electrode 1.

The tab cleaner 117 cleans the active material layer unformed portion 7 of the electrode 1. The collection section 119 is arranged in each of the electrolyte solution treatment bath 15, the dope baths 17, 19, 21 and the cleaning bath 23. The collection section 119 collects a liquid taken out from the bath by the electrode 1, and returns the liquid to the bath.

The end sensor 121 detects a position of the end in the width direction W of the electrode 1. The electrode manufacturing system 11 adjusts positions of the supply roll 101 and the wind-up roll 103 in the width direction W based on the detection result of the end sensor 121.

Figure 6:
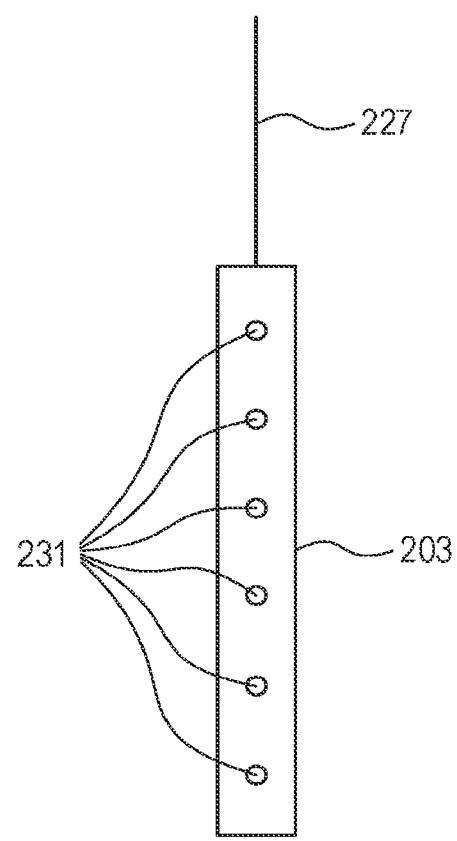
FIG. 6 is an explanatory diagram showing a configuration of a nozzle.
Figure 7:
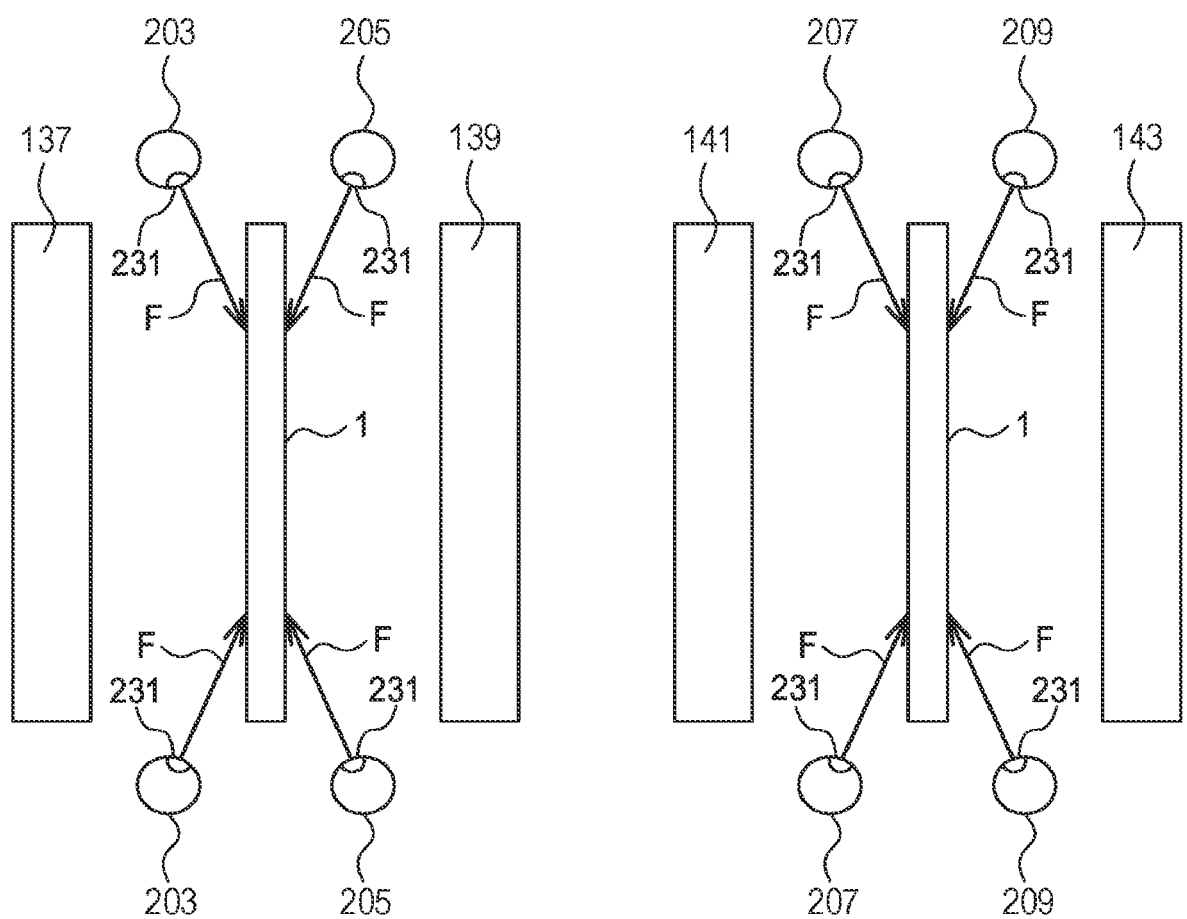
FIG. 7 is an explanatory diagram showing an arrangement of nozzles, electrodes, and counter electrode members when seen from above.

The electrode manufacturing system 11 includes a flow section 201 for respective dope baths 17, 19, 21. A configuration of the flow section 201 in the dope bath 17 is shown in FIG. 4, FIG. 6, and FIG. 7. A similar configuration is also applied to the flow section 201 in the respective dope baths 19, 21.

The flow section 201 includes multiple nozzles 203, 205, 207, 209, 211, 213, 215, 217, two pumps 219, 221, and multiple pipes 223, 225, 227, 229.

As shown in FIG. 6, the nozzle 203 has a cylindrical form. The nozzle 203 includes multiple holes 231. The multiple holes 231 form a line at predetermined intervals along an axial direction of the nozzle 203. The positions of the multiple holes 231 in a circumferential direction are the same. The positions of the multiple holes 231 in the circumferential direction may be periodically varied in the axial direction of the nozzle 203. The nozzles 205, 207, 209, 211, 213, 215, and 217 each also have a configuration similar to the nozzle 203.

Figure 4:
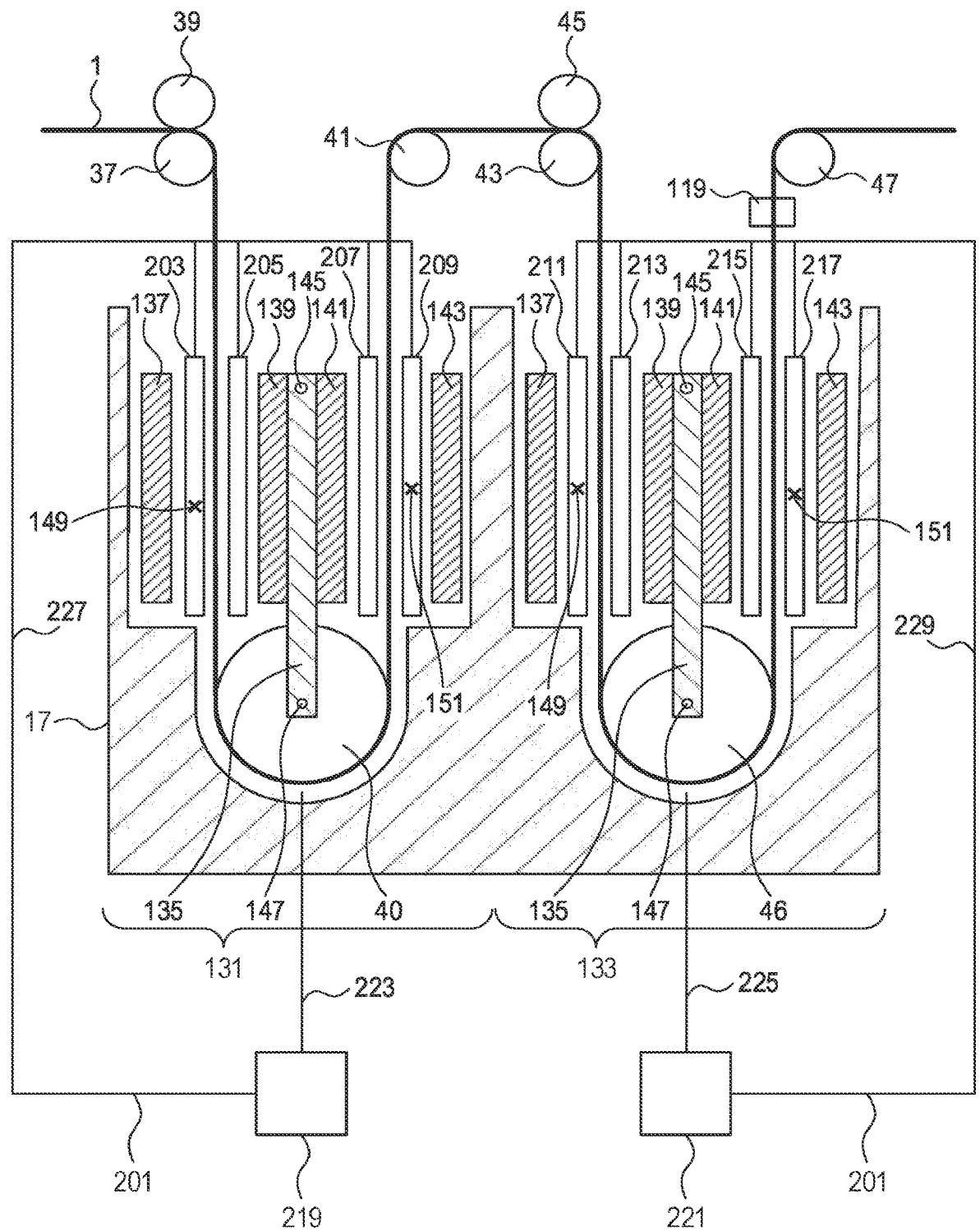
FIG. 4 is an explanatory diagram showing a configuration of a dope tank.
Figure 5:
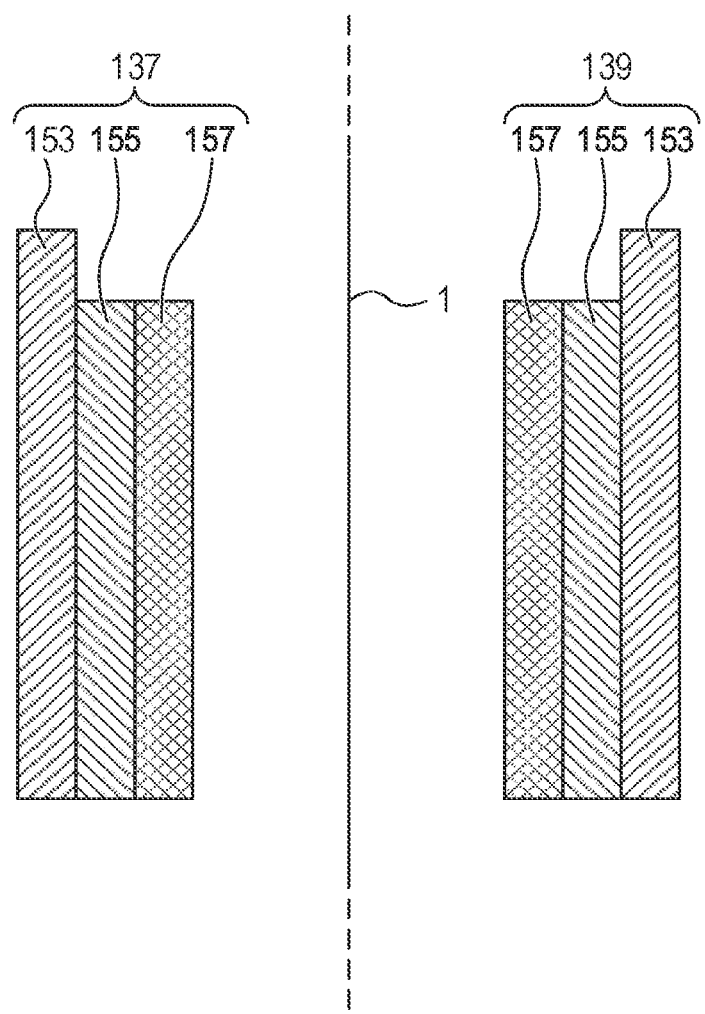
FIG. 5 is an explanatory diagram showing a configuration of a counter electrode member.

As shown in FIG. 4, the nozzle 203 is attached near the counter electrode member 137 in the upstream bath 131. The nozzle 205 is attached near the counter electrode member 139 in the upstream bath 131. The nozzle 207 is attached near the counter electrode member 141 in the upstream bath 131. The nozzle 209 is attached near the counter electrode member 143 in the upstream bath 131.

An arrangement of the nozzles 203, 205, 207, and 209 seen from the above is shown in FIG. 7. There are two nozzles 203, two nozzles 205, two nozzles 207, and two nozzles 209. The axial directions of the nozzles 203, 205, 207, and 209 are parallel to the longitudinal direction L of the electrode 1. In each of the nozzles 203, 205, 207, and 209, the holes 231 face toward the electrode 1.

In the width direction W of the electrode 1, the two nozzles 203 are respectively located near the ends of the electrode 1. In the thickness direction of the electrode 1, the two nozzles 203 are respectively located between the counter electrode member 137 and the electrode 1.

In the width direction W of the electrode 1, the two nozzles 205 are respectively located near the ends of the electrode 1. In the thickness direction of the electrode 1, the two nozzles 205 are respectively located between the counter electrode member 139 and the electrode 1.

In the width direction W of the electrode 1, the two nozzles 207 are respectively located near the ends of the electrode 1. In the thickness direction of the electrode 1, the two nozzles 207 are respectively located between the counter electrode member 141 and the electrode 1.

In the width direction W of the electrode 1, the two nozzles 209 are respectively located near the ends of the electrode 1. In the thickness direction of the electrode 1, the two nozzles 209 are respectively located between the counter electrode member 143 and the electrode 1.

The pump 219 sucks the dope solution from the upstream bath 131 using the pipe 223. The pump 219 sends the sucked dope solution to the nozzles 203, 205, 207, 209 using the pipe 227. The sent dope solution is discharged from the holes 231 of the nozzles 203, 205, 207, and 209. The discharged dope solution flows along directions F directed toward the electrode 1. The flow of the dope solution may be started before the electrode 1 is set in the conveyer roller group, or after the electrode 1 is set in the conveyer roller group.

As a result, the dope solution flows between the counter electrode member 137 and the electrode 1 of the upstream bath 131, between the counter electrode member 139 and the electrode 1 of the upstream bath 131, between the counter electrode member 141 and the electrode 1 of the upstream bath 131, and between the counter electrode member 143 and the electrode 1 of the upstream bath 131 flow. The flow directions of the dope solution are approximately parallel to the surface of the electrode 1. The flow directions of the dope solution are approximately orthogonal to the longitudinal direction L of the electrode 1.

Here, the meaning of "substantially parallel" is as follows. When the center of the hole 231 is a position A, and a position on the surface of the electrode 1 at the same height as position A and in the middle of the width direction W is a position B. If an angle formed by a line passing through the position A and the position B and the surface of the electrode 1 is 45 degrees or less, such configuration is called "approximately parallel".

The flow directions of the dope solution discharged from the hole 231 may be changed using a plate-shaped jig or the like. For example, the flow directions of the dope solution, which are changed using the plate-shaped jig or the like, are approximately parallel to the surface of the electrode 1.

As shown in FIG. 4, the nozzle 211 is attached near the counter electrode member 137 in the downstream bath 133. The nozzle 213 is attached near the counter electrode member 139 in the downstream bath 133. The nozzle 215 is attached near the counter electrode member 141 in the downstream bath 133. The nozzle 217 is attached near the counter electrode member 143 in the downstream bath 133.

The arrangements and the directions of the nozzles 211, 213, 215, and 217 are similar to those of the nozzles 203, 205, 207, and 209. The axial directions of the nozzles 211, 213, 215, and 217 are parallel to the longitudinal direction L of the electrode 1. In each of the nozzles 211, 213, 215, and 217, the holes 231 face toward the electrode 1.

The pump 221 sucks the dope solution from the downstream bath 133 using the pipe 225. The pump 221 sends the sucked dope solution to the nozzles 211, 213, 215, 217 using the pipe 229. The sent dope solution is discharged from the holes 231 of the nozzles 211, 213, 215, 217. The discharged dope solution flows along directions F directed toward the electrode 1.

As a result, the dope solution flows between the counter electrode member 137 and the electrode 1 of the downstream bath 133, between the counter electrode member 139 and the electrode 1 of the downstream bath 133, between the counter electrode member 141 and the electrode 1 of the downstream bath 133, and between the counter electrode member 143 and the electrode 1 of the downstream bath 133 flow. The flow directions of the dope solution are approximately parallel to the surface of the electrode 1. The flow directions of the dope solution are orthogonal to the longitudinal direction L of the electrode 1.

As described above, the dope solution flows between the electrode 1 and each counter electrode member flows due to the flow section 201. Each counter electrode member means the counter electrode members 137, 139, 141, 143 of the upstream bath 131 and the counter electrode members 137, 139, 141, 143 of the downstream bath 133. An average flow velocity of the flow of the dope solution produced by the flow section 201 is represented by J (cm/sec).

The average flow velocity J can be defined as follows. A cross section is assumed in the flow channel of the dope solution. The cross section is orthogonal to the flow direction of the dope solution. The average volumetric flow rate per unit time of the dope solution passing through the cross section is represented by V ($cm^3$/sec). An area of the cross section is represented by S ($cm^2$). The average flow velocity J is represented by V/S (cm/sec).

3. Composition of Dope Solution

When the electrode manufacturing system 11 is used, a dope solution is stored in the electrolyte solution treatment bath 15 and the dope baths 17, 19, 21. The dope solution includes an alkali metal ion and a solvent. The dope solution is an electrolyte solution.

Examples of the solvent may include one or more selected from a group consisting of a carbonate-based solvent, an ester-based solvent, an ether-based solvent, a hydrocarbon-based solvent, a ketone-based solvent, a nitrile-based solvent, sulfur containing solvent and an amide-based solvent.

Examples of the carbonate-based solvent may include ethylene carbonate, 1-fluoroethylene carbonate, dimethyl carbonate, diethyl carbonate, dipropyl carbonate, methylpropyl carbonate, ethyl propyl carbonate, methylethyl carbonate, ethylmethyl carbonate, propylene carbonate, and butylene carbonate.

Examples of the ester-based solvent may include butyl acetate, amyl acetate, propylene glycolmonomethyl ether acetate, ethylene glycol monoethyl ether acetate, diethylene glycol monobutyl ether acetate, diethylene glycol monoethyl ether acetate, ethyl-3-ethoxypropionate, 3-methoxybutyl acetate, 3-methyl-3-methoxybutyl acetate, butyl formate, propyl formate, ethyl lactate, butyl lactate, lactic acid propyl, gamma-butyrolactone, valerolactone, mevalonolactone, and caprolactone.

Examples of the ether-based solvent may include ethyl ether, i-propyl ether, n-butyl ether, n-hexyl ether, 2-ethylhexy ether, ethylene oxide, 1,2-propylene oxide, dioxolane, 4-methyldioxolane, dioxane, dimethyl dioxane, tetrahydrofuran, 2-methyltetrahydrofuran, ethylene glycol dimethyl ether, ethylene glycol diethyl ether, diethylene glycol dimethyl ether, diethylene glycol diethyl ether, propylene glycol dimethyl ether, propylene glycol diethyl ether, dipropylene glycol dimethyl ether, and dipropylene glycol diethyl ether.

Examples of the hydrocarbon-based solvent may include n-pentane, pentane, n-hexane, i-hexane, n-heptane, i-heptane, 2,2,4-trimethylpentane, n-octane, i-octane, cyclohexane, methylcyclohexane, benzene, toluene, xylene, ethyl benzene, trimethylbenzene, methylethylbenzene, n-propylbenzene, i-propylbenzene, diethylbenzene, i-butylbenzene, triethylbenzene, di-i-propylbenzene, n-amyl naphthalene, and trimethylbenzene.

Examples of the ketone solvent may include 1-octanone, 2-octanone, 1-nonanone, 2-nonanone, 4-heptanone, 2-hexanone, diisobutyl ketone, cyclohexanone, methylcyclohexanone, phenyl acetone, and methyl isobutyl ketone.

Examples of the nitrile-based solvent may include acetonitrile and propionitrile. Examples of the sulfur-based solvent may include sulfolane and dimethylsulfoxide. Examples of the amide-based solvent may include dimethyl acetamide, dimethylformamide, and N-methylpyrrolidone.

The solvent may be formed of a single component, or may be a mixed solvent formed of two or more components.

The alkali metal ion contained in the dope solution is an ion composing an alkali metal salt. The alkali metal salt is preferably a lithium salt or a sodium salt, and more preferably, a lithium salt. Examples of an anionic moiety composing the alkali metal salt may include a phosphorus anion having a fluoro group, such as $PF_6^-$, $PF_3(C_2F_5)_3^-$, $PF_3(CF_3)_3^-$, and the like; a boron anion having a fluoro group or a cyano group, such as $BF_4^-$, $BF_2(CF)_2^-$, $BF_3(CF_3)^-$, $B(CN)_4^-$; a sulfonyl imide anion having a fluoro group, such as $N(FSO_2)_2^-$, $N(CF_3SO_2)_2^-$, and $N(C_2F_5SO_2)_2^-$; and an organic sulfonic acid anion having a fluoro group, such as $CF_3SO_3^-$.

Example of the lithium salt may include $LiClO_4$, $LiAsF_6$, $LiBF_4$, $LiPF_6$, $LiN(FSO_2)_2$, $LiN(C_2F_5SO_2)_2$, and $LiN(CF_3SO_2)_2$.

The concentration of the alkali metal salt in the dope solution is preferably 0.1 mol/L or more, and more preferably within a range of 0.5 to 1.5 mol/L. When the concentration of the alkali metal salt is within this range, pre-doping of the alkali metal progresses efficiently.

The dope solution can further contain an additive, such as vinylene carbonate, vinyl ethylene carbonate, 1-fluoroethylene carbonate, 1-(trifluoromethyl) ethylene carbonate, succinic anhydride, maleic anhydride, propane sultone, and diethyl sulfone.

The dope solution can further contain a flame retardant, such as a phosphazene compound. From a viewpoint of effectively controlling a thermal runaway reaction during doping the alkali metal, an amount of addition of the flame retardant is preferably 1 part by mass or more to 100 parts by mass of the dope solution, more preferably 3 parts by mass or more, and still more preferably 5 parts by mass or more. From a viewpoint of obtaining a high-quality doped electrode, an amount of addition of the flame retardant is preferably 20 parts by mass or less to 100 parts by mass of the dope solution, more preferably 15 parts by mass or less, and further preferably 10 parts by mass or less.

4. Method for Manufacturing Doped Electrode Using Electrode Manufacturing System 11

The method for manufacturing the doped electrode is as follows. The electrode 1 before pre-doping is wound around the supply roll 101. Next, the electrode 1 before pre-doping is drawn from the supply roll 101, and is set along the path to the wind-up roll 103. Then, the electrolyte solution treatment bath 15, the dope baths 17, 19, 21 and the cleaning bath 23 are raised and set to a fixed position as shown in FIG. 3.

Then, a dope solution is stored in the electrolyte solution treatment bath 15 and the dope baths 17, 19, 21. The dope solution is a solution described in the above "3. Composition of Dope Solution". The temperature of the dope solution is 40° C. or more and 100° C. or less. A cleaning liquid is stored in the cleaning bath 23. The cleaning liquid is an organic solvent.

Then, the electrode 1 is conveyed along the path from the supply roll 101 to the wind-up roll 103 by the conveyer roller group. The path to convey the electrode 1 is a path passing through the dope baths 17, 19, 21. The conveying direction of the electrode 1 is parallel to the longitudinal direction L. When the electrode 1 passes through the dope baths 17, 19, 21, the alkali metal is pre-doped to the active material contained in the active material layer 5.

During the pre-doping, the dope solution in the dope baths 17, 19, 21 is flowed by the flow section 201. More specifically, in respective dope baths 17, 19, 21, the dope solution between the electrode 1 and the counter electrode member is flowed by the flow section 201. The electrode 1 comes in contact with the flowing dope solution. The dope solution does not have to constantly flow, and preferably flows when the alkali metal is doped to the electrode 1.

In the respective dope baths 17, 19, 21, the pre-doping is performed in a state that the electrode 1 and each counter electrode member are electrically connected through the electrolyte solution. In the respective dope baths 17, 19, 21, a current density per area of the electrode 1 during pre-doping is represented by I ($mA/cm^2$). In the respective dope baths 17, 19, 21, an average flow velocity of the dope solution is represented by J (cm/sec). It is preferable that the average flow velocity J and the current density I of the dope solution during pre-doping satisfy the relationship of a following formula (1).

$$0 < I/J \leq 200 \quad \text{Formula (1)}$$

I/J is preferably 1 or more, more preferably 5 or more, and further preferably 10 or more. When I/J is 5 or more, the lithium doping can be uniformly performed in the electrode plane, and when I/J is 10 or more, this effect is even more remarkable.

I/J is preferably 150 or less, more preferably 100 or less, and further preferably 60 or less. When I/J is 100 or less, precipitation of lithium can be inhibited in a case where the doping speed is increased, and when I/J is 60 or less, this effect is even more remarkable.

The current density I is preferably 5 $mA/cm^2$ or more, more preferably 25 $mA/cm^2$ or more, still more preferably 45 $mA/cm^2$ or more, and further preferably 60 $mA/cm^2$ or more. When the current density I is 5 $mA/cm^2$ or more, the doping speed is more improved. When the current density I is 25 $mA/cm^2$ or more, the effect is further remarkable. When the current density I is 45 $mA/cm^2$ or more, the effect is furthermore remarkable. When the current density I is 60 $mA/cm^2$ or more, the effect is particularly remarkable.

The current density I is preferably 500 $mA/cm^2$ or less, more preferably 300 $mA/cm^2$ or less, further preferably 180 $mA/cm^2$ or less, and particularly preferably 170 $mA/cm^2$ or less. When the current density I is 500 $mA/cm^2$ or less, the precipitation of lithium can be inhibited. When the current density I is 300 $mA/cm^2$ or less, the precipitation of lithium can be more inhibited. When the current density I is 180 $mA/cm^2$ or less, the precipitation of lithium can be further inhibited. When the current density I is 170 $mA/cm^2$ or less, the precipitation of lithium can be particularly inhibited. The average flow velocity J of the dope solution is preferably 0.1 cm/sec or more, more preferably 0.5 cm/sec or more, and further preferably 1.0 cm/sec or more. When the average flow velocity J of the dope solution is 0.1 cm/sec or more, the doping speed is more improved. When the average flow velocity J of the dope solution is 0.5 cm/sec or more, the doping speed is further improved. When the average flow velocity J of the dope solution is 1.0 cm/sec or more, the doping speed is particularly improved.

The average flow velocity J of the dope solution is preferably 20 cm/sec or less, more preferably 10 cm/sec or less, and further preferably 5 cm/sec or less. When the average flow velocity J of the dope solution is 20 cm/sec or less, the precipitation of lithium can be inhibited. When the average flow velocity J of the dope solution is 10 cm/sec or less, the precipitation of lithium can be more inhibited. When the average flow velocity J of the dope solution is 5 cm/sec or less, the precipitation of lithium can be particularly inhibited.

During the pre-doping, the electrode 1 is conveyed along the path by the conveyer roller group. The conveying direction is parallel to the longitudinal direction L of the electrode 1. The conveying direction of the electrode 1 corresponds to a predetermined direction. The flow direction of the dope solution is orthogonal to the longitudinal direction L of the electrode 1. Thus, in the pre-doping, the flow direction of the dope solution is orthogonal to the conveying direction of the electrode 1.

The conveyer roller group conveys the electrode 1 to the cleaning bath 23. The electrode 1 is cleaned in the cleaning bath 23 while being conveyed by the conveyer roller group.

The conveyer roller group continuously conveys the electrode 1 to the tab cleaner 117. Tab cleaner 117 cleans the active material layer unformed portion 7 of the electrode 1.

The electrode 1 may be a positive electrode or a negative electrode. When producing the positive electrode, the electrode manufacturing system 11 dopes the alkali metal to a positive electrode active material. When producing the negative electrode, the electrode manufacturing system 11 dopes the alkali metal to a negative electrode active material.

When lithium is occluded in a negative electrode active material of a lithium ion capacitor, a doping amount of the alkali metal is preferably 70% or more and 95% or less to a theoretical capacity of the negative electrode active material. When lithium is occluded in a negative electrode active material of a lithium ion rechargeable battery, the doping amount of the alkali metal is preferably 10% or more and 30% or less to a theoretical capacity of the negative electrode active material.

5. Method for Manufacturing Power Storage Device

Examples of a power storage device may include a battery and a capacitor. Examples of the battery may include a lithium ion rechargeable battery. Examples of the capacitor may include a lithium ion capacitor. The power storage device includes an electrode cell. The electrode cell has a configuration that a negative electrode and a positive electrode are stacked.

In the method for manufacturing the power storage device, a negative electrode is produced in accordance with the above "4. Method for Manufacturing Doped Electrode using Electrode Manufacturing System 11". Then, the negative electrode and a positive electrode are stacked to form an electrode cell.

6. Effects Achieved by Method for Manufacturing Doped Electrode and Method for Manufacturing Power Storage Device (1A) In the method for manufacturing the doped electrode according to the present disclosure, the alkali metal is doped to the active material by bringing the dope solution flowing and containing alkali metal ions in contact with the electrode 1. According to the method for manufacturing the doped electrode according to the present disclosure, the doping speed in the pre-doping can be improved. The reason that the doping speed improves is considered that the concentration of the solvent component on the surface of the electrode 1 is inhibited because the dope solution flows. Examples of the solvent component may include ethylene carbonate.

In addition to the method to move the dope solution as described above, the method to inhibit the concentration of the solvent component on the surface of the electrode 1 may also include a method in which the electrode 1 is irradiated with ultrasonic waves.

(1B) In the method for manufacturing the doped electrode according to the present disclosure, for example, the alkali metal is electrically doped to the active material using the counter electrode members 137, 139, 141, 143 arranged to face the electrode 1. This can even more improve the doping speed in the pre-doping.

(1C) In the method for manufacturing the doped electrode according to the present disclosure, the alkali metal is doped to the active material in a state where the dope solution between the counter electrode members 137, 139, 141, 143 and the electrode 1 flows. This can even more improve the doping speed in the pre-doping.

(1D) In the method for manufacturing the doped electrode according to the present disclosure, for example, the relation between the current density I (mA/cm$^2$) and the average flow velocity J (cm/sec) of the dope solution satisfies formula (1) below.

$$0 < I/J \leq 200 \qquad \text{Formula (1)}$$

This can even more improve the doping speed in the pre-doping.

(1E) In the method for manufacturing the doped electrode according to the present disclosure, for example, the current density I is 25 mA/cm$^2$ or more and 500 mA/cm$^2$ or less. This can even more improve the doping speed in the pre-doping.

(1F) In the method for manufacturing the doped electrode according to the present disclosure, for example, when the alkali metal is doped to the active material, the electrode 1 is moved in a predetermined direction in the dope solution. This can even more improve the doping speed in the pre-doping.

(1G) In the method for manufacturing the doped electrode according to the present disclosure, for example, when the alkali metal is doped to the active material, the flow direction of the dope solution is approximately parallel to the surface of the electrode 1. This can even more improve the doping speed in the pre-doping.

(1H) In the method for manufacturing the doped electrode according to the present disclosure, for example, when the alkali metal is doped to the active material, the flow direction of the dope solution is orthogonal to a conveying direction of the electrode 1. This can even more improve the doping speed in the pre-doping.

(1I) In the method for manufacturing the doped electrode according to the present disclosure, for example, when the alkali metal is doped to the active material, the temperature of the dope solution is 40° C. or more and 100° C. or less. This can even more improve the doping speed in the pre-doping.

(1J) In the method for manufacturing the doped electrode according to the present disclosure, for example, it is preferable that the electrolyte concentration of the dope solution is 0.8 mol/L or more and 5.0 mol/L or less, and further preferably 1.3 mol/L or more and 4.0 mol/L or less. This can even more improve the doping speed in the pre-doping and can even more improve an initial coulombic efficiency.

(1K) In the method for manufacturing the doped electrode according to the present disclosure, for example, the solvent of the dope solution is one or more selected from a group consisting of a carbonate-based solvent, an ester-based solvent, an ether-based solvent, a hydrocarbon-based solvent, a nitrile-based solvent, sulfur containing solvent and an amide-based solvent. This can even more improve the doping speed in the pre-doping.

(1L) In the method for manufacturing the power storage device according the present disclosure, a negative electrode is manufactured by the method for manufacturing the doped electrode according to the present disclosure. This can even more improve the doping speed in the pre-doping of the negative electrode.

(1M) In the method for manufacturing the doped electrode according to the present disclosure, a desired amount of doping can be realized in the pre-doping while inhibiting the precipitation of lithium.

(1N) In the method for manufacturing the doped electrode according to the present disclosure, it is possible to manufacture a doped electrode having a desired initial coulombic efficiency when used as an electrode.

7. Embodiment 1

(7-1) Manufacture of Electrode 1

A negative electrode slurry was obtained by sufficiently mixing a composition including 31 parts by mass of SiO, 62 parts by mass of artificial graphite, 4 parts by mass of acetylene black powder, 2 parts by mass of SBR binder, 1 part by mass of carboxymetyl-cellulose, and 85 parts by mass of ion-exchange water using a planetary mixer. The acetylene black corresponds to a conductive agent.

A current collector 3 was prepared. In Example 1, the current collector 3 was a negative current collector. The size of the current collector 3 was 150 mm in width, 300 mm in length, and 10 μm in thickness. The surface roughness Ra of the current collector 3 was 0.1 μm. The current collector 3 was formed of copper foil.

The negative electrode slurry was applied to each side of the current collector 3 using a doctor blade comma coater. As a result, as shown in FIG. 2, an active material layer 5 was formed on each side of the current collector 3. In Example 1, the active material layer 5 corresponds to a negative electrode active material layer.

Then, the resultant was dried under reduced pressure at 120° C. for 12 hours. Then, an electrode 1 was obtained by pressing the current collector 3 and the active material layers 5 using a roll-pressing machine. In Example 1, the electrode 1 corresponds to a negative electrode for a power storage device.

The total coating weight of the active material layers 5 formed on the both sides of the electrode 1 was 120 g/m². The total thickness of the active material layers 5 formed on the both sides of the electrode 1 was 80 μm. The active material layers 5 were formed along a longitudinal direction of the current collector 3 as shown in FIG. 1. The active material layers 5 were formed in the central part in the width direction of the current collector 3 so as to extend for 120 mm in width. An active material layer unformed portion 7 on each end in the width direction of the current collector 3 was 15 mm. The active material layer unformed portion 7 is a portion in which the active material layer 5 is not formed.

(7-2) Formation of Simplified Doped Electrode Manufacturing Apparatus 339

Figure 9:
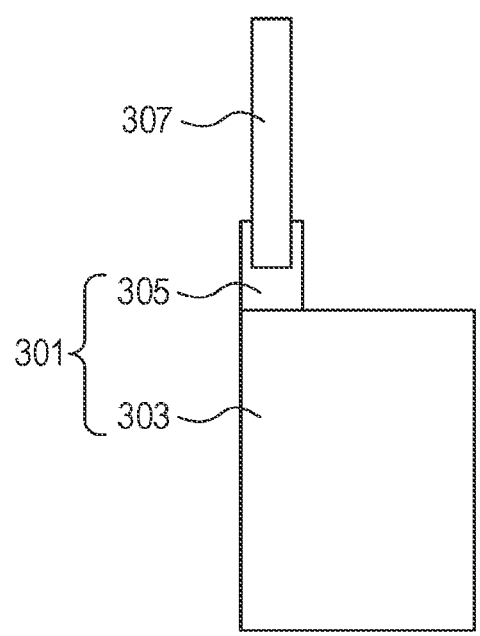
FIG. 9 is a plane view showing a configuration of an electrode test piece.

From the electrode 1, an electrode test piece 301 shown in FIG. 9 was cut out. The electrode test piece 301 included a rectangular main body 303 and a protruding portion 305. The main body 303 was a portion cut out from the active material layer formed portion 6 of the electrode 1. The length of the short side of the main body 303 was 26 mm. The length of the long side of the main body 303 was 40 mm.

The protruding portion 305 was a portion cut out from the active material layer unformed portion 7 of the electrode 1. The protruding portion 305 was connected to the short side of the main body 303. A lead 307 was attached to the protruding portion 305. The thickness of the lead 307 was 0.1 mm. The width of the lead 307 was 3 mm. The length of the lead 307 was 50 mm. The material of the lead 307 was stainless steel SUS316.

Figure 10:
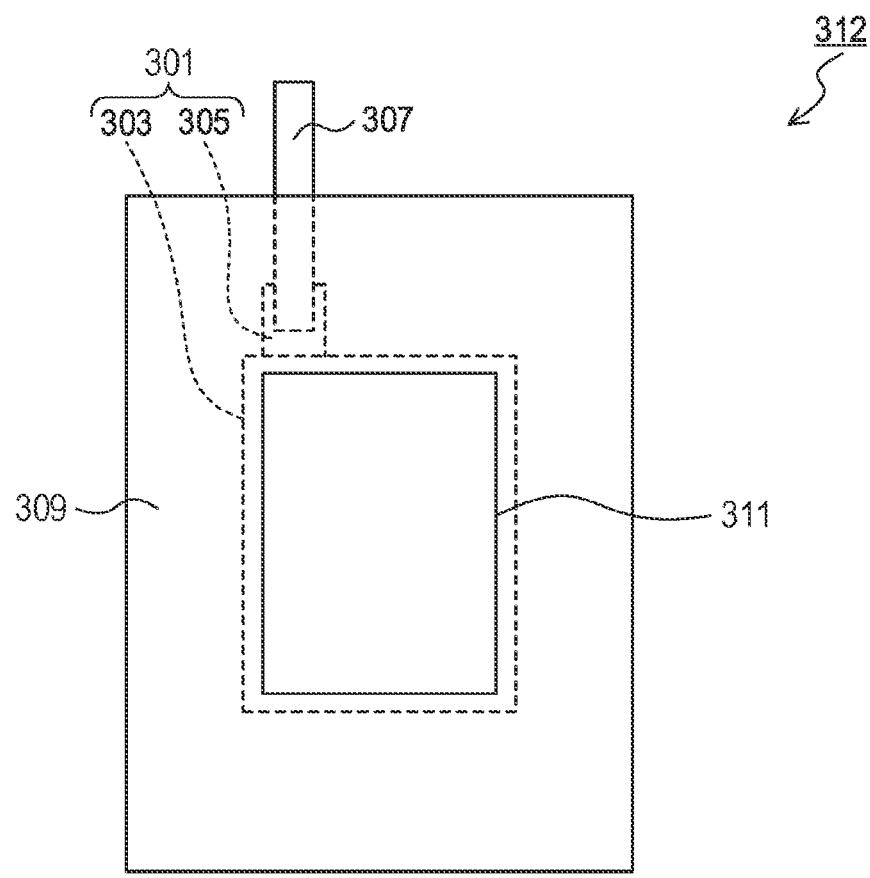
FIG. 10 is a plane view showing a configuration of an electrode assembly.

Two Teflon plates 309 shown in FIG. 10 were prepared. The basic form of each Teflon plate 309 was a rectangle. The length of the short side of the Teflon plate 309 was 80 mm. The length of the long side of the Teflon plate 309 was 90 mm. The thickness of the Teflon plate 309 was 1 mm. The material of the Teflon plate 309 was polytetrafluoroethylene.

The Teflon plate 309 had a rectangular opening 311 in its central portion. The opening 311 penetrated through the Teflon plate 309 in the thickness direction. The length of the short side of the opening 311 was 24 mm. The length of the long side of the opening 311 was 37 mm.

The two Teflon plates 309 were placed on the both sides of the electrode test piece 301. As shown in FIG. 10, in the main body 303, a peripheral portion was sandwiched by the two Teflon plates 309. In the main body 303, a portion except for the peripheral portion was exposed through the opening 311. The lead 307 protruded toward a peripheral direction of the two Teflon plates 309 through a gap between the two Teflon plates 309. A member composed of the electrode test piece 301, the two Teflon plates 309, and the lead 307 was used as an electrode assembly 312.

Figure 11:
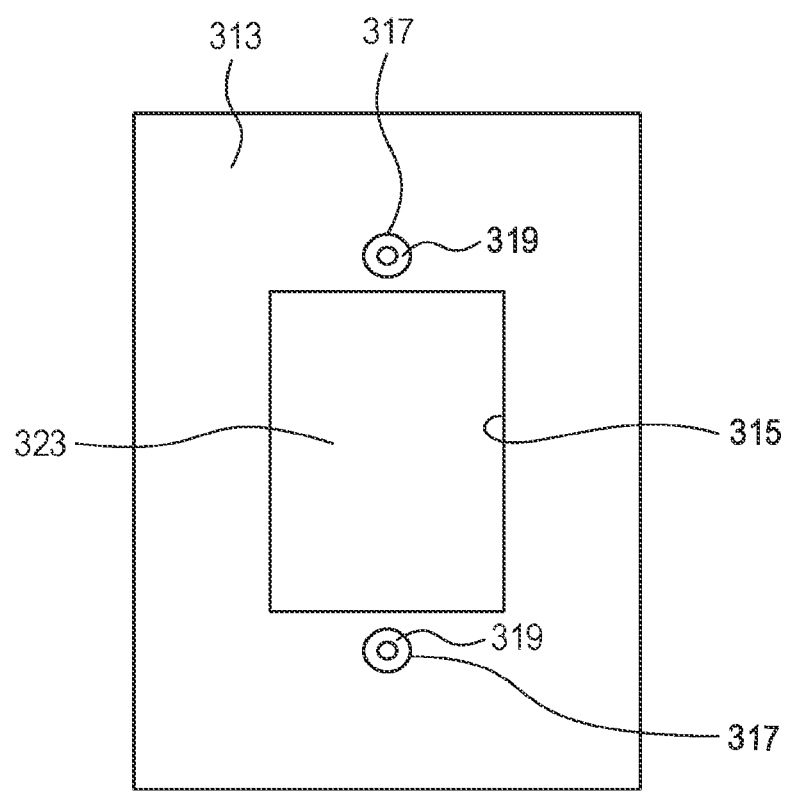
FIG. 11 is a plan view showing a configuration of a stainless steel board.
Figure 12:
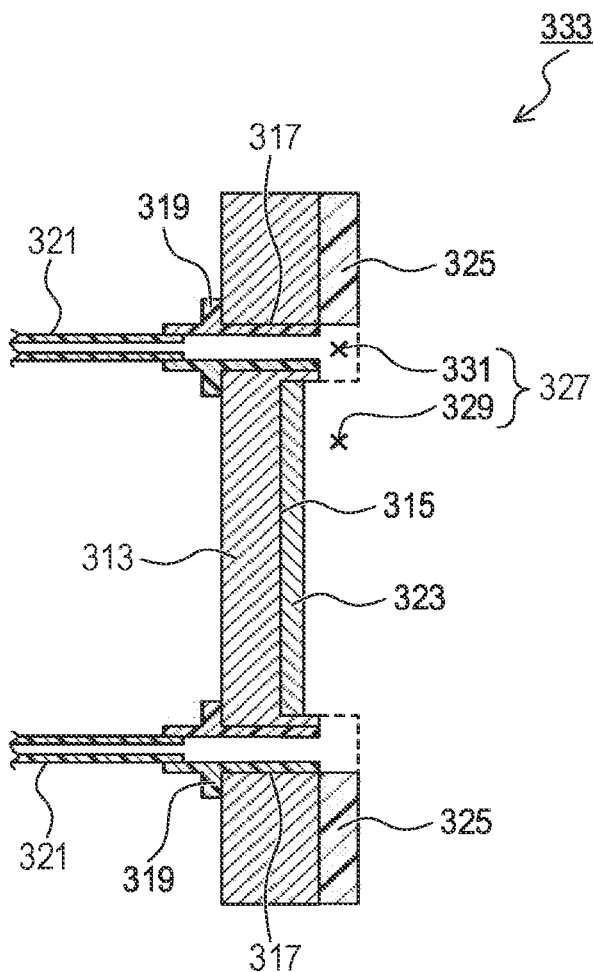
FIG. 12 is a cross-sectional view showing a configuration of a counter electrode member.

A stainless steel plate 313 shown in FIG. 11 and FIG. 12 was prepared. The basic form of the stainless steel plate 313 was a rectangle. The length of the short side of the stainless steel plate 313 was 80 mm. The length of the long side of the stainless steel plate 313 was 90 mm. The thickness of the stainless steel plate 313 was 4 mm. The material of the stainless steel plate 313 was stainless steel.

The stainless steel plate 313 included a recess 315 in the central part on one side. The shape of the recess 315 was a rectangle when seen from the thickness direction of the stainless steel plate 313. The length of the short side of the recess 315 was 14 mm. The length of the long side of the recess 315 was 37 mm. The depth of the recess 315 was 0.3 mm.

The stainless steel plate 313 included two threaded bores 317. The threaded bores 317 penetrated through the stainless steel plate 313 in the thickness direction. The position of each threaded bore 317 was 6 mm from the short side of the recess 315 toward the peripheral direction of the stainless steel plate 313. The diameter of the threaded bore 317 was 6 mm.

As shown in FIG. 12, a tube connector 319 made of Teflon was attached to each threaded bore 317. To the tube connectors 319, a fluororubber tubes 321 were connected. The inner diameter of the fluororubber tube 321 was 3 mm. The fluororubber tubes 321 were located on the opposite side of the recess 315 when seen from the stainless steel plate 313.

A lithium metal plate 323 shown in FIG. 11 and FIG. 12 was prepared. The shape of the lithium metal plate 323 was a rectangle. The length of the short side of the lithium metal plate 323 was 26 mm. The length of the long side of the lithium metal plate 323 was 40 mm. The thickness of the lithium metal plate 323 was 0.06 mm. As shown in FIG. 11 and FIG. 12, the lithium metal plate 323 was attached to the inside of the recess 315.

Figure 13:
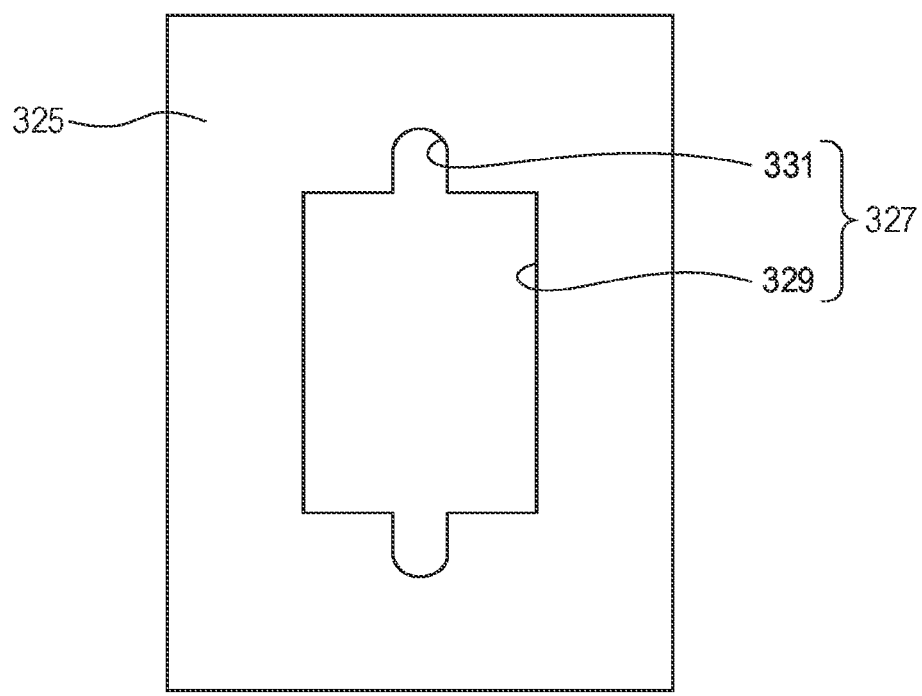
FIG. 13 is a plan view showing a configuration of a Teflon (registered trademark) board.

A Teflon plate 325 shown in FIG. 13 was prepared. The basic form of the Teflon plate 325 was a rectangle. The length of the short side of the Teflon plate 325 was 80 mm. The length of the long side of the Teflon plate 325 was 90 mm. The thickness of the Teflon plate 325 was 1 mm. The material of the Teflon plate 325 was polytetrafluoroethylene.

The Teflon plate 325 included an opening 327 in its central portion. The opening 327 penetrated through the Teflon plate 325 in the thickness direction. The opening 327 had a rectangular main body 329 and a notch 331. The length of the short side of the main body 329 was 24 mm. The length of the long side of the main body 329 was 37 mm. The notch 331 extended in a peripheral direction of the Teflon plate 325 from the short side of the main body 329.

As shown in FIG. 12, the Teflon plate 325 was placed over the surface of the stainless steel plate 313 on the side where the recess 315 was formed. The main body 329 was placed at a position overlapped with the lithium metal plate 323 when seen from the thickness direction. Thus, the lithium metal plate 323 was not covered by the Teflon plate 325. The notches 331 were placed at positions overlapped with the threaded bores 317 when seen from the thickness direction. Thus, the threaded bores 317 were not covered by the Teflon plate 325.

A member composed of the stainless steel plate 313, the tube connector 319, the fluororubber tube 321, the lithium metal plate 323, and the Teflon plate 325 was used as a counter electrode member 333.

Figure 14:
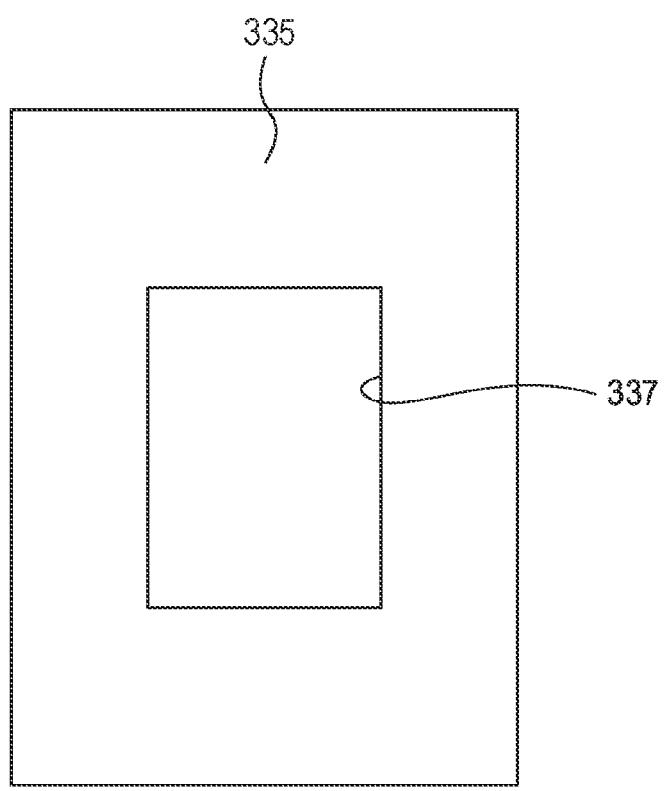
FIG. 14 is a plan view showing a configuration of a spacer.

A spacer 335 shown in FIG. 14 was prepared. The basic form of the spacer 335 was a rectangle. The length of the short side of the spacer 335 was 80 mm. The length of the long side of the spacer 335 was 90 mm. The thickness of the spacer 335 was 4 mm. The material of the spacer 335 was stainless steel.

The spacer 335 had a rectangular opening 337 in its central portion. The opening 337 penetrated through the spacer 335 in the thickness direction. The length of the short side of the opening 337 was 34 mm. The length of the long side of the opening 337 was 42 mm.

Figure 15:
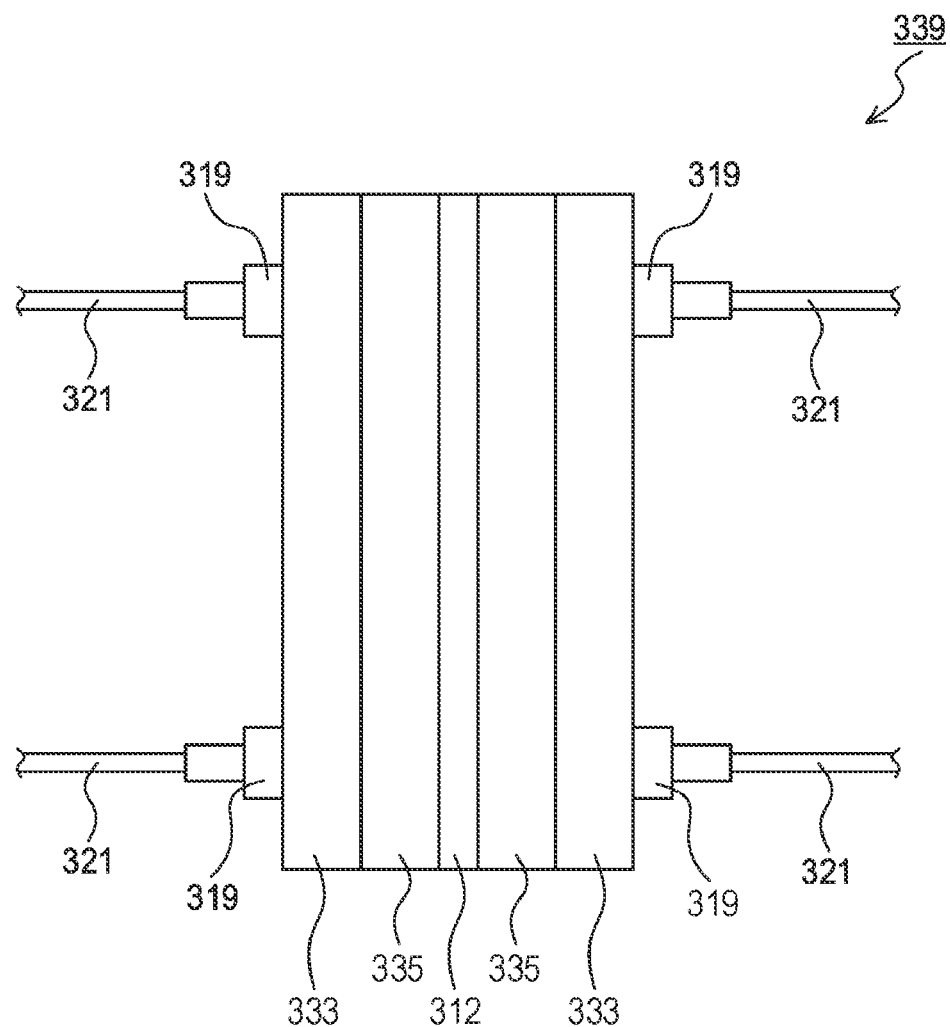
FIG. 15 is a side view showing a configuration of a simplified doped electrode manufacturing apparatus.

As shown in FIG. 15, the electrode assembly 312, two spacers 335, and two counter electrode members 333 were stacked and fixed to obtain a simplified doped electrode manufacturing apparatus 339. In the simplified doped electrode manufacturing apparatus 339, the counter electrode members 333 were arranged to face the electrode assembly 312.

(7-3) Manufacture of Doped Electrode

A dope solution was supplied from the lower fluororubber tube 321 to the inside of the simplified doped electrode manufacturing apparatus 339, and the equal amount of dope solution was sucked into the upper fluororubber tube 321, whereby the dope solution was flowed. The flow rate of the dope solution was 0.37 ml/sec. In the inside of the simplified doped electrode manufacturing apparatus 339, a cross section of a portion where the dope solution was flowed was 1.84 cm$^2$. The average flow velocity J of the dope solution was 0.2 cm/sec. The average flow velocity J is a value obtained by dividing the flow rate of the dope solution by the cross section of the portion where the dope solution flows. The temperature of the dope solution was 25° C. The supplied dope solution was in contact with the electrode test piece 301 while flowing between the counter electrode member 333 and the electrode test piece 301. The flow direction of the dope solution was approximately parallel to the surface of the electrode 1.

The dope solution was a solution containing 1.2M of $LiPF_6$. The solvent of the dope solution was a mixed solvent containing ethylene carbonate, 1-fluoroethylene carbonate, and ethylmethyl carbonate at a volume ratio of 1:2:7.

Next, the electrode assembly 312 and the counter electrode members 333 were connected to a direct current power source with a current/voltage monitor.

Then, an electric current of 0.42 A was applied so that the current density per unit area of each side of the negative electrode was 20 mA/cm$^2$, and lithium was doped to the electrode.

The energization time was set to a time when the lithium dope ratio per unit area became 20% of the discharge capacity per unit area of the negative electrode. However, when the voltage became a predetermined value or more within the energization time, the energization was stopped. The discharge capacitive equivalent to the lithium dope ratio per unit area was set as a target doping amount.

Through the above-described processes, lithium was doped to the negative electrode active material in the active material layer 5, and the electrode test piece 301 became a doped electrode. In the present example and Examples 2-15 and Comparative Examples 1-5 described below, the doped electrode was a negative electrode for a power storage device and was a negative electrode for a lithium ion rechargeable battery.

(7-4) Evaluation of Doped Electrode

From the obtained doped electrode, a rectangular measurement sample was cut out. The length of the short side of the measurement sample was 1.5 cm. The length of the long side of the measurement sample was 2.0 cm. The area of the measurement sample was 3.0 cm$^2$.

Counter electrodes for the measurement sample were prepared. The shape of each counter electrode was a rectangle. The length of the short side of the counter electrode was 1.5 cm. The length of the long side of the counter electrode was 2.0 cm. The area of the counter electrode was 3.0 cm$^2$. The thickness of the counter electrode was 200 μm. The material of the counter electrode was metal lithium.

Separators were prepared. The thickness of each separator was 50 μm. The material of the separator was a nonwoven fabric made of polyethylene.

The measurement sample, the separators, reference electrodes and an electrolyte solution were used to form a coin-type cell for an electrode evaluation of the negative electrode. In the coin-type cell, the counter electrode was placed on each side of the measurement sample with the separator interposed therebetween. The reference electrode was a metal lithium plate. The electrolyte solution contained 1.4 M of LiPF$_6$. The solvent of the electrolyte solution was a liquid mixture containing ethylene carbonate, 1-fluoroethylene carbonate, and ethylmethyl carbonate at a volume ratio of 1:2:7.

The obtained coin-type cell was charged until the cell became 0 V with a charging electric current of 4 mA. Then, a constant current-constant voltage charge was performed at 0 V until the charging current was narrowed down to 0.4 mA, and a charging capacity was calculated. After that, a constant-current discharge was performed until the cell voltage became 3.0 V with a discharge current of 4 mA, and a discharge capacity was calculated. The obtained discharge capacity was divided by the charging capacity to obtain an initial coulombic efficiency.

Based on the difference between the obtained charging capacity and a discharge capacity before the electrode was doped, an actual doping amount was calculated. Then, a ratio of the actual doping amount to the target doping amount was calculated. Results thereof are shown in Table 1 and Table 2.

TABLE 1

| | Temperature of Dope Solution [° C.] | Electrolyte Solution | Concentration | Current [mA] | Current Density I [mA/cm$^2$] | I/J [C/cm$^3$] | Average Flow Velocity J of Dope Solution [cm/sec] | Flow Rate of Dope Solution [cm$^3$/sec] |
|---|---|---|---|---|---|---|---|---|
| Example 1 | 25 | EC/FEC/EMC = 10/20/70 | 1.2 | 416.0 | 20 | 100 | 0.20 | 0.37 |
| Example 2 | 25 | | 1.2 | 624.0 | 30 | 100 | 0.30 | 0.55 |
| Example 3 | 25 | | 1.2 | 1560.0 | 75 | 100 | 0.75 | 1.38 |
| Example 4 | 25 | | 1.2 | 3120.0 | 150 | 100 | 1.50 | 2.76 |
| Example 5 | 25 | | 1.2 | 5200.0 | 250 | 100 | 2.50 | 4.60 |
| Example 6 | 25 | | 1.2 | 10400.0 | 500 | 100 | 5.00 | 9.20 |
| Example 7 | 25 | | 1.2 | 12480.0 | 600 | 100 | 6.00 | 11.04 |
| Example 8 | 25 | | 1.2 | 3120.0 | 150 | 75 | 2.00 | 3.68 |
| Example 9 | 25 | | 1.2 | 3120.0 | 150 | 50 | 3.00 | 5.52 |
| Example 10 | 25 | | 1.2 | 3120.0 | 150 | 25 | 6.00 | 11.04 |
| Example 11 | 25 | | 1.2 | 1560.0 | 75 | 10 | 7.50 | 13.80 |
| Example 12 | 25 | | 1.2 | 3120.0 | 150 | 10 | 15.00 | 27.60 |
| Example 13 | 25 | | 1.2 | 5200.0 | 250 | 10 | 25.00 | 46.00 |
| Example 14 | 25 | | 1.2 | 5200.0 | 250 | 200 | 1.25 | 2.30 |
| Example 15 | 40 | | 1.2 | 3120.0 | 150 | 100 | 1.50 | 2.76 |
| Example 16 | 70 | | 1.2 | 3120.0 | 150 | 100 | 1.50 | 2.76 |
| Example 17 | 100 | | 1.2 | 3120.0 | 150 | 100 | 1.50 | 2.76 |
| Comparative Example 1 | 40 | EC/FEC/EMC = 10/20/70 | 1.5 | 416.0 | 20 | — | | |
| Comparative Example 2 | 40 | | 1.5 | 1560.0 | 75 | — | | |
| Comparative Example 3 | 25 | | 1.5 | 3120.0 | 150 | — | | |
| Comparative Example 4 | 25 | | 1.2 | 104.0 | 5 | — | | |
| Comparative Example 5 | 25 | | 1.2 | 208.0 | 10 | — | | |

| | Target Doping Amount [mAh/cm$^2$] | Doping Amount [mAh/cm$^2$] | Target Doping Time [sec] | Judgement | Doping Amount/ Target Doping Amount [%] | Judgement | Comprehensive Judgement |
|---|---|---|---|---|---|---|---|
| Example 1 | 1.10 | 1.10 | 198 | Δ | 100.0 | ○ | Passed |
| Example 2 | 1.10 | 1.10 | 132 | Δ | 100.0 | ○ | Passed |
| Example 3 | 1.10 | 1.06 | 53 | ○ | 96.4 | ○ | Passed |
| Example 4 | 1.10 | 1.00 | 26 | ○ | 90.9 | ○ | Passed |
| Example 5 | 1.10 | 0.90 | 16 | ○ | 81.8 | ○ | Passed |
| Example 6 | 1.10 | 0.82 | 8 | ○ | 74.5 | ○ | Passed |
| Example 7 | 1.10 | 0.75 | 7 | ○ | 68.2 | Δ | Passed |
| Example 8 | 1.10 | 1.02 | 26 | ○ | 92.7 | ○ | Passed |
| Example 9 | 1.10 | 1.09 | 26 | ○ | 99.1 | ○ | Passed |
| Example 10 | 1.10 | 1.10 | 26 | ○ | 100.0 | ○ | Passed |
| Example 11 | 1.10 | 1.09 | 53 | ○ | 99.1 | ○ | Passed |
| Example 12 | 1.10 | 1.05 | 26 | ○ | 95.5 | ○ | Passed |
| Example 13 | 1.10 | 1.00 | 16 | ○ | 90.9 | ○ | Passed |
| Example 14 | 1.10 | 0.69 | 16 | ○ | 62.7 | Δ | Passed |
| Example 15 | 1.10 | 1.05 | 26 | ○ | 95.5 | ○ | Passed |
| Example 16 | 1.10 | 1.10 | 26 | ○ | 100.0 | ○ | Passed |
| Example 17 | 1.10 | 1.10 | 26 | ○ | 100.0 | ○ | Passed |
| Comparative Example 1 | 1.10 | 0.51 | 198 | Δ | 46.4 | x | Failed |
| Comparative Example 2 | 1.10 | 0.39 | 53 | ○ | 35.5 | x | Failed |
| Comparative Example 3 | 1.10 | 0.22 | 26 | ○ | 20.0 | x | Failed |
| Comparative Example 4 | 1.10 | 1.10 | 792 | x | 100.0 | ○ | Failed |

TABLE 1-continued

|  | | | | | | | | |
|---|---|---|---|---|---|---|---|---|
| Comparative Example 5 | 1.10 | 1.10 | 396 | x | 100.0 | ○ | | Failed |

TABLE 2

| | Temperature of Dope Solution [° C.] | Electrolyte Solution | Concentration | Current [mA] | Current Density I [mA/cm²] | I/J [C/cm³] | Average Flow Velocity J of Dope Solution [cm/sec] | Flow Rate of Dope Solution [cm³/sec] |
|---|---|---|---|---|---|---|---|---|
| Example 12 | 25 | EC/FEC/EMC = 10/20/70 | 1.2 | 3120.0 | 150 | 10 | 15.00 | 27.60 |
| Example 18 | 25 | EC/FEC/EMC = 10/20/70 | 0.8 | 3120.0 | 150 | 10 | 15.00 | 27.60 |
| Example 19 | 25 | | 1 | 3120.0 | 150 | 10 | 15.00 | 27.60 |
| Example 20 | 25 | | 1.5 | 3120.0 | 150 | 10 | 15.00 | 27.60 |
| Example 21 | 25 | | 2 | 3120.0 | 150 | 10 | 15.00 | 27.60 |
| Example 22 | 25 | | 3 | 3120.0 | 150 | 10 | 15.00 | 27.60 |
| Example 23 | 25 | | 5 | 3120.0 | 150 | 10 | 15.00 | 27.60 |
| Example 24 | 25 | EC/FEC/EMC = 20/20/60 | 1.2 | 3120.0 | 150 | 10 | 15.00 | 27.60 |
| Example 25 | 25 | EC/FEC/EMC = 30/20/40 | 1.2 | 3120.0 | 150 | 10 | 15.00 | 27.60 |
| Example 26 | 25 | EC/FEC/EMC = 50/20/20 | 1.2 | 3120.0 | 150 | 10 | 15.00 | 27.60 |
| Example 27 | 25 | EC/PC = 30/70 | 1.2 | 3120.0 | 150 | 10 | 15.00 | 27.60 |

| | Initial Coulombic Efficiency [—] | Judgement | Target Doping Amount [mAh/cm²] | Doping Amount [mAh/cm²] | Target Doping Time [sec] | Judgement | Doping Amount/ Target Doping Amount [%] | Judgement | Comprehensive Judgement |
|---|---|---|---|---|---|---|---|---|---|
| Example 12 | 88 | Δ | 1.10 | 1.05 | 26 | ○ | 95.5 | ○ | Passed |
| Example 18 | 86 | Δ | 1.10 | 1.08 | 26 | ○ | 98.2 | ○ | Passed |
| Example 19 | 89 | Δ | 1.10 | 1.04 | 26 | ○ | 94.5 | ○ | Passed |
| Example 20 | 90 | ○ | 1.10 | 1.00 | 26 | ○ | 90.9 | ○ | Passed |
| Example 21 | 92 | ○ | 1.10 | 0.95 | 26 | ○ | 85.4 | ○ | Passed |
| Example 22 | 97 | ○ | 1.10 | 0.80 | 26 | ○ | 72.7 | ○ | Passed |
| Example 23 | 96 | ○ | 1.10 | 0.70 | 26 | ○ | 63.6 | Δ | Passed |
| Example 24 | 90 | ○ | 1.10 | 1.00 | 26 | ○ | 90.9 | ○ | Passed |
| Example 25 | 95 | ○ | 1.10 | 1.00 | 26 | ○ | 90.9 | ○ | Passed |
| Example 26 | 95 | ○ | 1.10 | 0.95 | 26 | ○ | 86.4 | ○ | Passed |
| Example 27 | 95 | ○ | 1.10 | 1.10 | 26 | ○ | 100.0 | ○ | Passed |

In Table 1 and Table 2, the target doping time is a doping time supposed to be required to reach the target doping amount. The target doping time is calculated from a current density and a target doping amount. "Concentration" in Table 1 and Table 2 is the concentration of the electrolyte. The unit of the concentration is mol/L.

8. Examples 2-27 and Comparative Examples 1-5

Doped electrodes were manufactured in the same way as Example 1, except that temperatures of dope solutions, types of electrolyte solutions, electric current, current density, flow rates of the dope solutions, and average flow velocities J were set to the values shown in Table 1 and Table 2, and the obtained doped electrodes were evaluated. In Comparative Examples 1-5, the simplified doped electrode manufacturing apparatus 339 was filled with a dope solution, and then the doping was carried out without supplying a dope solution. Evaluation results are shown in Table 1 and Table 2.

In Table 1 and Table 2, the target doping time, a ratio of the actual doping amount to the target doping amount, and the initial coulombic efficiency were evaluated based on each criteria indicated below. In Table 1 and Table 2, if the item "Comprehensive Judgement" indicates "Passed", it means that the evaluation result of the target doping time and the evaluation result of the ratio of actual doping amount to the target doping amount are both evaluated as "○ (Good)".
(Evaluation Criteria for Target Doping Time)
 ○ (Good): less than 100 sec
 Δ (Average): 100 sec or more and less than 300 sec
 X (Poor): 300 sec or more
(Evaluation Criteria for Ratio of Doping Amount)
 ○ (Good): 70% or more
 Δ (Average): 50% or more and less than 70% ○
 X (Poor): less than 50%
(Evaluation Criteria for Initial Coulombic Efficiency)
 ○ (Good): 90 or more
 Δ (Average): 85 or more and less than 90
 X (Poor): 85 or less As shown in Table 1 and Table 2, Examples achieved preferable results compared to Comparative Examples. Even in the case of manufacturing the doped electrodes using the electrode manufacturing system 11 described in the embodiment, the effects similar to those in each Example were achieved and the doping speed was confirmed to be improved. In the doped electrodes of Comparative Examples 1-3, the precipitation of lithium was confirmed.

Second Embodiment

1. Difference from First Embodiment

The basic configuration of a second embodiment is similar to that of the first embodiment, and thus, differences will be described hereinafter. The reference numeral same as that in the first embodiment indicates the same configuration and refers to the preceding description.

Figure 16:
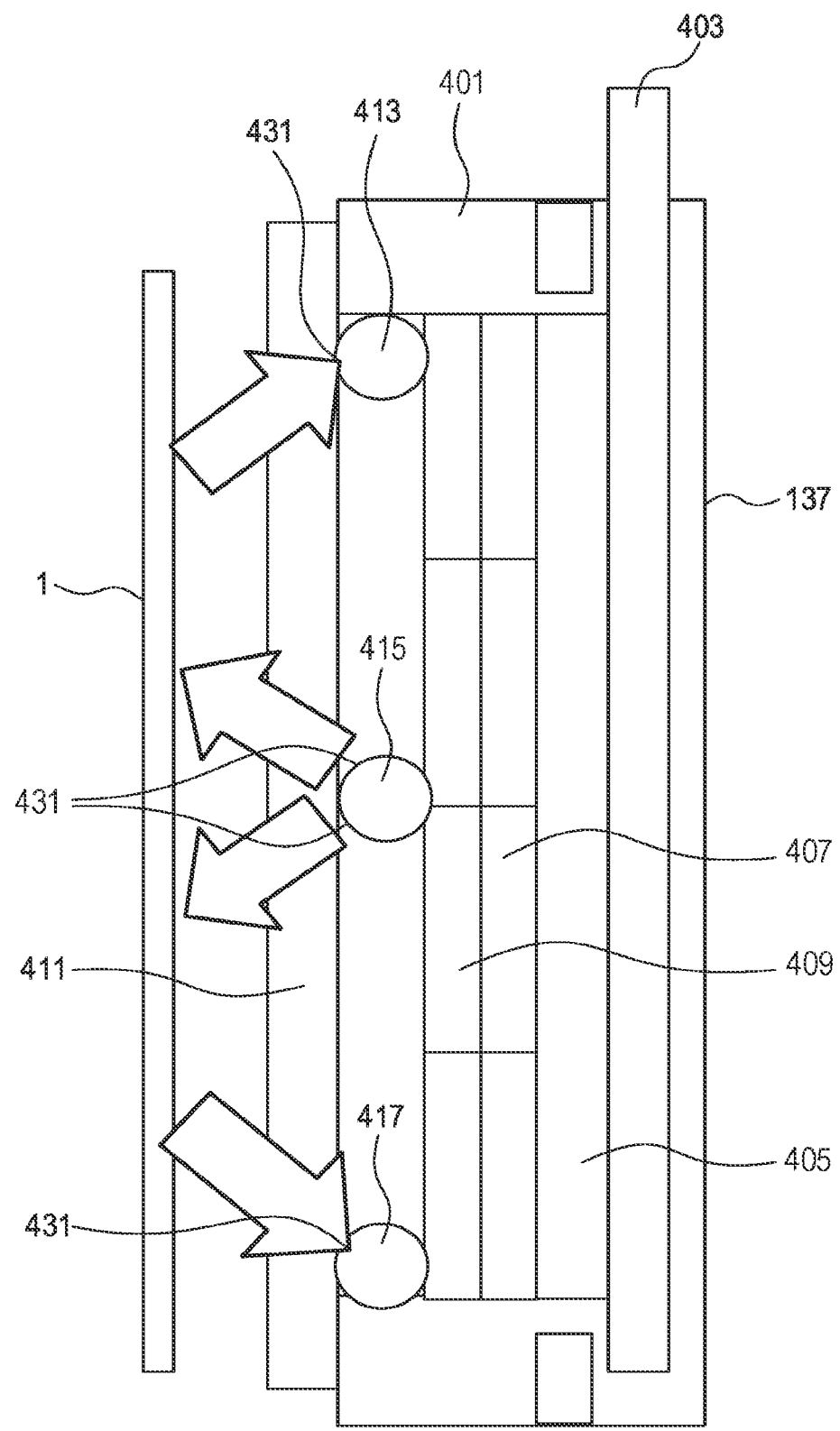
FIG. 16 is an explanatory diagram showing a configuration of the counter electrode members and the nozzles.
Figure 17:
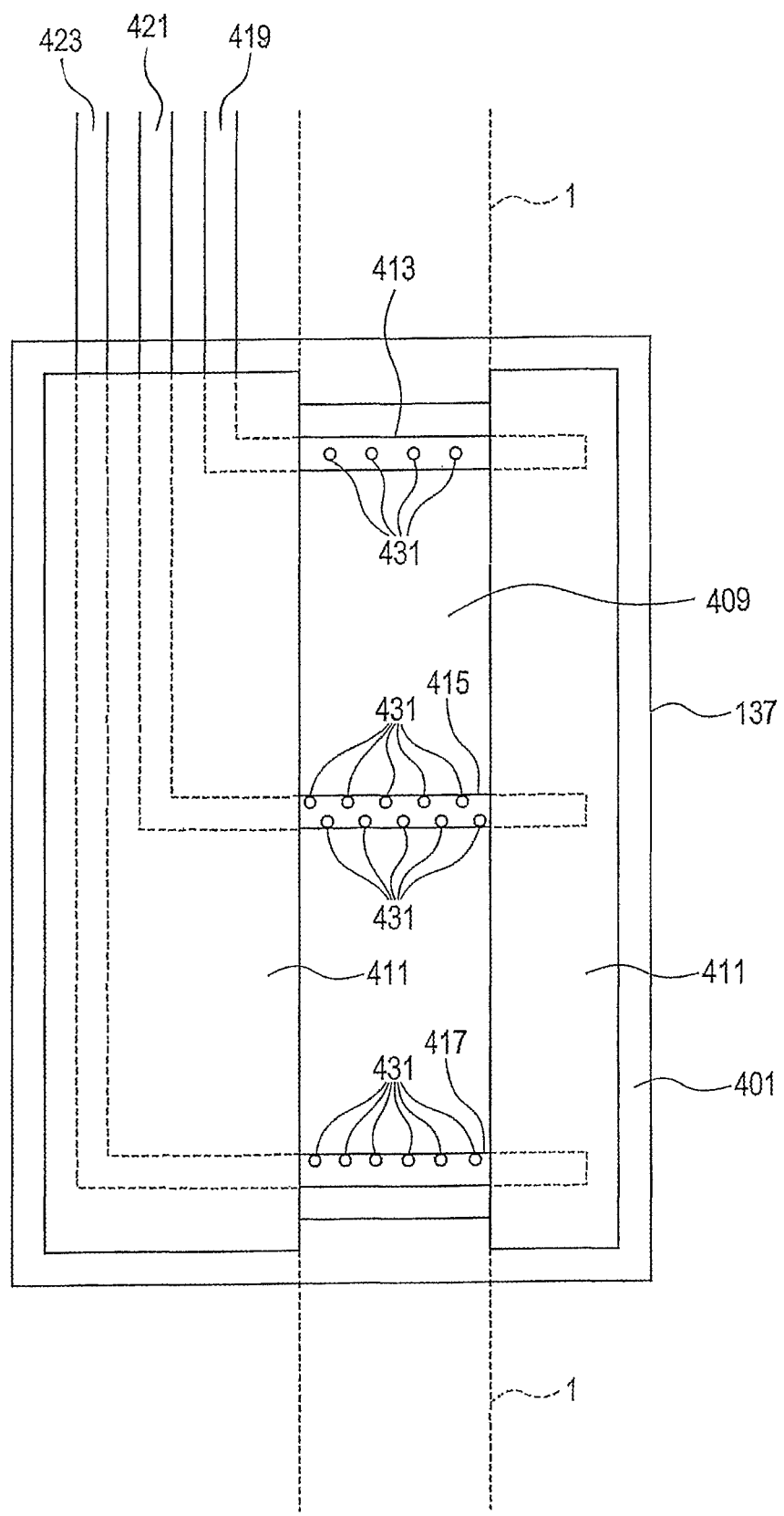
FIG. 17 is an explanatory diagram showing a counter electrode member and the configuration of the nozzle.

A counter electrode member 137 has a configuration shown in FIG. 16 and FIG. 17. Also, counter electrode members 139, 141, 143 each have a configuration same as the counter electrode member 137.

The counter electrode member 137 includes a frame 401, a bus bar 403, an electroconductive spacer 405, a copper plate 407, a lithium plate 409 and a mask 411.

The frame 401 is a box member open on the electrode 1 side. The frame 401 is made of polypropylene. The bus bar 403 is an electrically conductive member. A large part of the bus bar 403 is stored in the frame 401. One end of the bus bar 403 protrudes outside the frame 401. The bus bar 403 is electrically connected to a power source.

The electroconductive spacer 405, the copper plate 407 and the lithium plate 409 are stored in the frame 401. The lithium plate 409 is electrically connected to the power source through the copper plate 407, the electroconductive spacer 405, and the bus bar 403. As shown in FIG. 17, the mask 411 exposes the lithium plate 409 in a portion facing the electrode 1 and covers other portions.

The flow section 201 includes nozzles 413, 415, 417 instead of the nozzles 203, 205, 207, 209, 211, 213, 215, 217. The nozzles 413, 415, 417 are arranged in each of the counter electrode members 137, 139, 141, 143. The nozzles 413, 415, 417 are connected to a pump of the flow section 201 respectively by pipes 419, 421, 423.

As shown in FIG. 16, the nozzles 413, 415, 417 are located between the electrode 1 and the counter electrode member 137. The nozzles 413, 415, 417 are located between the lithium plate 409 and the electrode 1. The nozzles 413, 415, 417 are vertically arranged. The nozzles 413, 415, 417 each have a cylindrical form. An axial direction of each of the nozzles 413, 415, 417 is a horizontal and is parallel to the surface of the electrode 1. As shown in FIG. 17, the nozzles 413, 415, 417 are not covered by the mask 411 over a portion facing the electrode 1.

The nozzle 413 includes multiple holes 431. The multiple holes 431 are arranged at predetermined intervals along the axial direction of the nozzle 413. The positions of the multiple holes 431 in the circumferential direction are the same. Since the axial direction of the nozzle 413 is a horizontal direction, the multiple holes 431 are arranged along the horizontal direction. The nozzle 417 also has a configuration similar to that of the nozzle 413.

The nozzle 415 includes multiple holes 431. The multiple holes 431 are arranged at predetermined intervals along the axial direction of the nozzle 415. The positions of the multiple holes 431 in the circumferential direction are periodically differentiated along the axial direction of the nozzle 415.

The holes 431 of the nozzle 413 and the holes 431 of the nozzle 417 suck a dope solution. The holes 431 of the nozzle 415 discharge the dope solution. As a result, the dope solution between the counter electrode member 137 and the electrode 1 flows. The dope solution also flows between the counter electrode member 139 and the electrode 1, between the counter electrode member 141 and the electrode 1, and between the counter electrode member 143 and the electrode 1.

2. Effects in Second Embodiment

According to the second embodiment, below-described effects can be achieved in addition to the effects in the first embodiment.

(2A) The multiple holes 431 are arranged along the horizontal direction. Therefore, the flow of the dope solution is uniform in the width direction W. As a result, it is possible to manufacture a doped electrode having high in-plane uniformity while improving the doping speed in the pre-doping.

OTHER EMBODIMENTS

Although the embodiments of the present disclosure have been described above, the present disclosure is not limited to the above-described embodiments, and can be embodied in various modifications.

Figure 8:
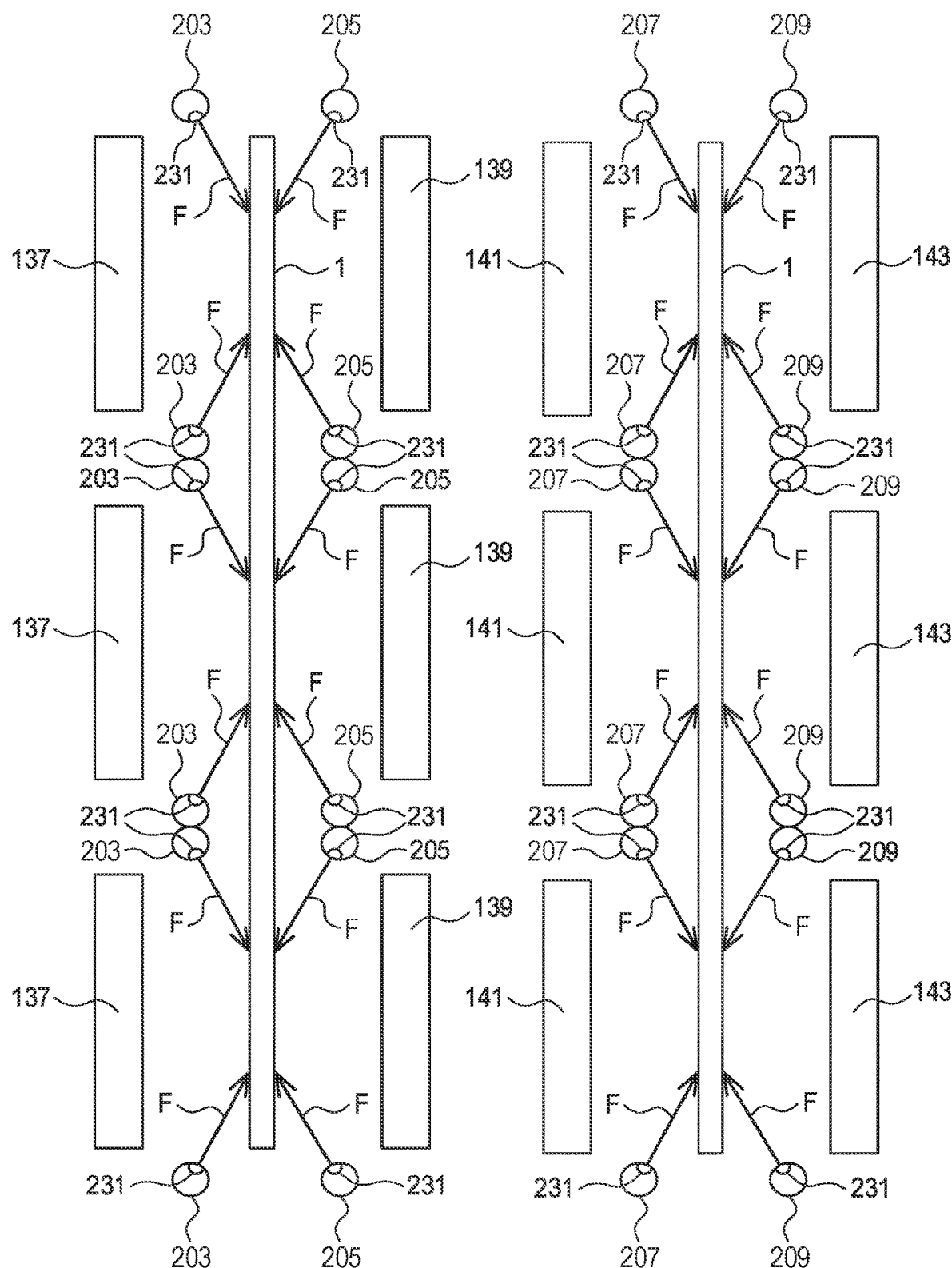
FIG. 8 is an explanatory diagram showing an arrangement of nozzles, electrodes, and counter electrode members in another embodiment when seen from above.

(1) As shown in FIG. 8, the electrode manufacturing system 11 may convey a wide electrode 1. The electrode manufacturing system 11 includes, in each of the upstream baths 131 of the dope baths 17, 19, 21, three or more nozzles 203, three or more nozzles 205, three or more nozzles 207, and three or more nozzles 209 as shown in FIG. 8. The three or more nozzles 203 are arranged along the width direction W. The same can be applied to the three or more nozzles 205, the three or more nozzles 207, and the three or more nozzles 209.

The electrode manufacturing system 11 includes, in each of the upstream baths 131 of the dope baths 17, 19, 21, multiple counter electrode members 137, multiple counter electrode members 139, multiple counter electrode members 141, and multiple counter electrode members 143. The multiple counter electrode members 137 are arranged along the width direction W. The same can be applied to the multiple counter electrode members 139, the multiple counter electrode members 141, and the multiple counter electrode members 143.

In the electrode manufacturing system 11, the downstream baths 133 of the dope baths 17, 19, 21 also have similar configurations. The electrode manufacturing system 11 may include one multi-use nozzle instead of the two adjacent nozzles. The multi-use nozzle includes two holes 231 in the circumferential direction. The multi-use nozzle discharges a dope solution in two directions from the two holes 231. The two directions are respectively directed to the electrode 1. After the pre-doping, a wide electrode 1 is cut along a cutting plane parallel to the longitudinal direction L to obtain multiple electrodes 1.

(2) In the above embodiments, the flow direction of the dope solution is a direction orthogonal to the conveying direction of the electrode 1; however, the flow direction is not limited to this and may be a direction same as or opposite the conveying direction of the electrode 1.

(3) A function served by a single element in any of the above-described embodiments may be achieved by a plurality of elements, or a function served by a plurality of elements may be achieved by a single element. Also, a part of a configuration in any of the above-described embodiments may be omitted. Furthermore, at least a part of a configuration in any of the above-described embodiments may be added to or replaced with another configuration of the embodiments.

(4) In addition to the method for manufacturing the doped electrode and the method for manufacturing the power storage device as described above, the present disclosure may be implemented in various forms, such as an electrode manufacturing system and a doping method.

The invention claimed is:

1. An electrode manufacturing method for manufacturing a doped electrode comprising an active material doped with an alkali metal, the method comprising:
doping an alkali metal to an active material in a state that a dope solution is in contact with an electrode, the dope solution flowing and comprising an alkali metal ion,
wherein the electrode comprises a current collector and an active material layer, and
wherein the active material layer is formed on a surface of the current collector and comprises the active material;
wherein the alkali metal is electrically doped to the active material using a counter electrode member arranged to face the electrode, and
wherein the dope solution is flowed by discharging the dope solution from a nozzle located between the electrode and the counter electrode member.

2. The method of claim 1, wherein the alkali metal is doped to the active material in a state that the dope solution is flowed between the electrode and the counter electrode member.

3. The method of claim 1, wherein a current density I per an area of the electrode is in a range of from 5 to 500 mA/cm$^2$.

4. The method of claim 3, wherein the electrode has a belt shape extending in a longitudinal direction, and
wherein the electrode is moved to the longitudinal direction in the dope solution when the alkali metal is doped to the active material.

5. The method of claim 4, wherein a flow direction of the dope solution is approximately parallel to a surface of the electrode when the alkali metal is doped to the active material.

6. The method of claim 5, wherein the flow direction of the dope solution is approximately orthogonal to a predetermined direction when the alkali metal is doped to the active material.

7. The method of claim 1, wherein a temperature of the dope solution is in a range of from 40 to 100° C. when the alkali metal is doped to the active material.

8. The method of claim 1, wherein an electrolyte concentration of the dope solution is in a range of from 0.8 to 5.0 mol/L.

9. The method of claim 1, wherein a solvent of the dope solution is one or more selected from a group consisting of a carbonate-based solvent, an ester-based solvent, an ether-based solvent, a hydrocarbon-based solvent, a ketone-based solvent, a nitrile-based solvent, a sulfur-comprising solvent and an amide-based solvent.

10. A method for manufacturing a power storage device including an electrode cell, the method comprising:
doping an alkali metal to an active material by bringing a dope solution in contact with a negative electrode, the dope solution flowing and comprising an alkali metal ion, the negative electrode including a negative current collector and a negative electrode active material layer, the negative electrode active material layer formed on a surface of the negative current collector, the negative electrode active material layer comprising the active material;
wherein the alkali metal is electrically doped to the active material using a counter electrode member arranged to face the negative electrode;
wherein the dope solution is flowed by discharging the dope solution from a nozzle located between the negative electrode and the counter electrode member; and
after the alkali metal is doped to the active material, stacking the negative electrode and an electrode different from the negative electrode to form the electrode cell.

11. An electrode manufacturing system configured for manufacturing a doped electrode comprising an active material doped with an alkali metal by performing, on an electrode, a process of doping an alkali metal to an active material, the electrode comprising a current collector and an active material layer, the active material layer formed on a surface of the current collector and comprising the active material, the system comprising:
a dope bath storing a dope solution comprising an alkali metal ion to carry out the process;
a flow section that causes the dope solution stored in the dope bath to flow; and
wherein the alkali metal is electrically doped to the active material using a counter electrode member arranged to face the electrode, and
wherein the dope solution is flowed by discharging the dope solution from a nozzle located between the electrode and the counter electrode member.

12. A doped electrode, manufactured by a method of claim 1.

* * * * *